US008472104B2

(12) United States Patent
Stowe et al.

(10) Patent No.: US 8,472,104 B2
(45) Date of Patent: Jun. 25, 2013

(54) SINGLE-PASS IMAGING SYSTEM USING SPATIAL LIGHT MODULATOR ANAMORPHIC PROJECTION OPTICS

(75) Inventors: Timothy David Stowe, Alameda, CA (US); Douglas N. Curry, San Mateo, CA (US); Patrick Y. Maeda, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 13/216,817

(22) Filed: Aug. 24, 2011

(65) Prior Publication Data

US 2013/0050799 A1 Feb. 28, 2013

(51) Int. Cl.
*G02B 26/00* (2006.01)

(52) U.S. Cl.
USPC .......... 359/290

(58) Field of Classification Search
USPC .......... 359/290–292, 223, 224; 347/255, 347/238, 239, 247, 256, 258; 358/474
See application file for complete search history.

(56) References Cited

U.S. PATENT DOCUMENTS

| | | | | |
|---|---|---|---|---|
| 3,800,699 | A | 4/1974 | Carley | |
| 5,105,369 | A | 4/1992 | Nelson | |
| 5,500,670 | A | 3/1996 | Ang et al. | |
| 5,719,682 | A | 2/1998 | Venkateswar | |
| 5,721,622 | A | 2/1998 | Venkateswar | |
| 5,754,217 | A | 5/1998 | Allen | |
| 5,953,152 | A * | 9/1999 | Hewlett | 359/298 |
| 5,954,424 | A * | 9/1999 | Anderson et al. | 362/242 |
| 6,121,984 | A * | 9/2000 | Anderson | 347/135 |
| 6,552,777 | B2 | 4/2003 | Sunagawa | |
| 6,567,217 | B1 * | 5/2003 | Kowarz et al. | 359/618 |
| 6,606,739 | B2 | 8/2003 | Kanatake et al. | |
| 7,048,388 | B2 | 5/2006 | Takaura et al. | |
| 7,218,380 | B2 | 5/2007 | De Jager | |
| 7,508,570 | B1 | 3/2009 | Meisburger | |
| 8,031,390 | B2 | 10/2011 | Grasser et al. | |
| 8,104,901 | B2 | 1/2012 | Kwon | |
| 8,199,178 | B1 | 6/2012 | Payne | |
| 8,282,221 | B2 | 10/2012 | Arai et al. | |
| 2008/0062390 | A1 | 3/2008 | Zhang et al. | |
| 2010/0208329 | A1 | 8/2010 | Sandstrom et al. | |
| 2013/0050669 | A1 | 2/2013 | Maeda | |

* cited by examiner

*Primary Examiner* — Tuyen Tra
(74) *Attorney, Agent, or Firm* — Bever, Hoffman & Harms, LLP; Patrick T. Bever

(57) ABSTRACT

A single-pass imaging system for a printing apparatus capable of 1200 dpi or greater that includes a homogenous light generator for generating homogenous light from high energy IR lasers, a spatial light modulator including light modulating elements arranged in a two-dimensional array, and an anamorphic optical system. The light modulating elements are disposed such that each modulating element receives an associated homogenous light portion, and is individually adjustable between an “on” modulated state and an “off” modulated state, whereby in the “on” modulated state each modulating element modulates its received homogenous light portion such that an associated modulated light portion is directed onto a corresponding region of the anamorphic optical system. In the second modulated state, the associated homogenous light portion is prevented (e.g., blocked) from passing to the anamorphic optical system. The anamorphic optical system then anamorphically concentrates the modulated light portions to form a scan line image.

16 Claims, 13 Drawing Sheets

SINGLE-PASS IMAGING SYSTEM USING SPATIAL LIGHT MODULATOR ANAMORPHIC PROJECTION OPTICS

FIELD OF THE INVENTION

This invention relates to imaging systems, and in particular to single-pass imaging systems that utilize high energy light sources for high speed image generation.

BACKGROUND OF THE INVENTION

Laser imaging systems are extensively used to generate images in applications such as xerographic printing, mask and maskless lithographic patterning, laser texturing of surfaces, and laser cutting machines. Laser printers often use a raster optical scanner (ROS) that sweeps a laser perpendicular to a process direction by utilizing a polygon or galvo scanner, whereas for cutting applications lasers imaging systems use flatbed x-y vector scanning.

One of the limitations of the laser ROS approach is that there are design tradeoffs between image resolution and the lateral extent of the scan line. These tradeoffs arise from optical performance limitations at the extremes of the scan line such as image field curvature. In practice, it is extremely difficult to achieve 1200 dpi resolution across a 20" imaging swath with single galvanometers or polygon scanners. Furthermore, a single laser head motorized x-y flatbed architecture, ideal for large area coverage, is too slow for most high speed printing processes.

For this reason, monolithic light emitting diode (LED) arrays of up to 20" in width have an imaging advantage for large width xerography. Unfortunately, present LED array are only capable of offering 10 milliWatt power levels per pixel and are therefore only useful for some non-thermal imaging applications such as xerography. In addition, LED bars have differential aging and performance spread. If a single LED fails it requires the entire LED bar be replaced. Many other imaging or marking applications require much higher power. For example, laser texturing, or cutting applications can require power levels in the 10W-100W range. Thus LED bars can not be used for these high power applications. Also, it is difficult to extend LEDs to higher speeds or resolutions above 1200 dpi without using two or more rows of staggered heads.

Higher power semiconductor laser arrays in the range of 100 mW-100 Watts do exist. Most often they exist in a 1D array format such as on a laser diode bar often about 1 cm in total width. Another type of high power directed light source are 2D surface emitting VCSEL arrays. However, neither of these high power laser technologies allow for the laser pitch between nearest neighbors to be compatible with 600 dpi or higher imaging resolution. In addition, neither of these technologies allow for the individual high speed control of each laser. Thus high power applications such as high power overhead projection imaging systems, often use a high power source such as a laser in combination with a spatial light modulator such as a DLP™ chip from Texas Instruments or liquid crystal arrays.

Prior art has shown that if imaging systems are arrayed side by side, they can be used to form projected images that overlap wherein the overlap can form a larger image using software to stitch together the image patterns into a seamless pattern. This has been shown in many maskless lithography systems such as those for PC board manufacturing as well as for display systems. In the past such arrayed imaging systems for high resolution applications have been arranged in such a way that they must use either two rows of imaging subsystems or use a double pass scanning configuration in order to stitch together a continuous high resolution image. This is because of physical hardware constraints on the dimensions of the optical subsystems. The double imaging row configuration can still be seamlessly stitched together using a conveyor to move the substrate in single direction but such a system requires a large amount of overhead hardware real estate and precision alignment between each imaging row.

For the maskless lithography application, the time between exposure and development of photoresist to be imaged is not critical and therefore the imaging of the photoresist along a single line does not need be exposed at once. However, sometimes the time between exposure and development is critical. For example, xerographic laser printing is based on imaging a photoreceptor by erasing charge which naturally decays over time. Thus the time between exposure and development is not time invariant. In such situations, it is desirable for the exposure system to expose a single line, or a few tightly spaced adjacent lines of high resolution of a surface at once.

In addition to xerographic printing applications, there are other marking systems where the time between exposure and development are critical. One example is the laser based variable data lithographic marking approach originally disclosed by Carley in U.S. Pat. No. 3,800,699 entitled, "FOUNTAIN SOLUTION IMAGE APPARATUS FOR ELECTRONIC LITHOGRAPHY". In standard offset lithographic printing, a static imaging plate is created that has hydrophobic imaging and hydrophilic non-imaging regions. A thin layer of water based dampening solution selectively wets the plate and forms an oleophobic layer which selectively rejects oil-based inks. In variable data lithographic marking disclosed in U.S. Pat. No. 3,800,699, a laser can be used to pattern ablate the fountain solution to form variable imaging regions on the fly. For such a system, a thin layer of dampening solution also decays in thickness over time, due to natural partial pressure evaporation into the surrounding air. Thus it is also advantageous to form a single continuous high power laser imaging line pattern formed in a single imaging pass step so that the liquid dampening film thickness is the same thickness everywhere at the image forming laser ablation step. However, for most arrayed high power high resolution imaging systems, the hardware and packaging surrounding a spatial light modulator usually prevent a seamless continuous line pattern to be imaged. Furthermore, for many areas of laser imaging such as texturing, lithography, computer to plate making, large area die cutting, or thermal based printing or other novel printing applications, what is needed is laser based imaging approach with high total optical power well above the level of 1 Watt that is scalable across large process widths in excess of 20" as well as having achievable resolution greater than 1200 dpi and allows high resolution high speed imaging in a single pass.

SUMMARY OF THE INVENTION

The present invention is directed to an imaging system that utilizes a homogenous light generator to generate a spatially homogenous light intensity that is spread (dispersed) evenly in amplitude over at least one dimension of a two-dimensional light field, a spatial light modulator disposed in the light field that modulates the homogenous light according to predetermined scan line image data, and an anamorphic optical system that focuses the modulated homogenous light to form a narrow scan line image. Here the term anamorphic optical system refers to any system of optical lens, mirrors, or other elements that project the light from an object plane such as a pattern of light formed by a spatial light modulator, to a final imaging plane with a differing amount of magnification along orthogonal directions. Thus, for example, a square-shaped imaging pattern formed by a 2D spatial light modulator could be anamorphically projected so as to magnify its width and at same time de-magnify (or bring to a concentrated focus) its height thereby transforming square shape into an image of an extremely thin elongated rectangular shape at the final image plane. By utilizing the anamorphic optical system to concentrate the modulated homogenous light, high total optical intensity (flux density) (i.e., on the order of hundreds of Watts/$cm^2$) can be generated on any point of the scan line image without requiring a high intensity light source to pass through a spatial light modulator, thereby facilitating a reliable yet high power imaging system that can be used, for example, for single-pass high resolution high speed printing applications. Furthermore, it should be clarified that the homogenous light generator, may include multiple optical elements such as light pipes or lens arrays, that reshape the light from one or more non-uniform sources of light so as to provide substantially uniform light intensity across at least one dimension of a two-dimensional light field. Many existing technologies for generating laser "flat top" profiles with a high degree of homogenization exist in the field.

According to an aspect of the present invention, the spatial light modulator includes multiple light modulating elements that are arranged in a two-dimensional array, and a controller for individually controlling the modulating elements such that a light modulating structure of each modulating element is adjustable between an "on" (first) modulated state and an "off" (second) modulated state in accordance with the predetermined scan line image data. Each light modulating structure is disposed to either pass or impede/redirect the associated portions of the homogenous light according to its modulated state. When one of the modulating elements is in the "on" modulated state, the modulating structure directs its associated modulated light portion in a corresponding predetermined direction (e.g., the element passes or reflects the associated light portion toward the anamorphic optical system). Conversely, when the modulating element is in the "off" modulated state, the associated received light portion is prevented from passing to the anamorphic optical system (e.g., the light modulating structure absorbs/blocks the associated light portion, or reflects the associated light portion away from the anamorphic optical system). By modulating homogenous light in this manner prior to being anamorphically projected and concentrated, the present invention is able to produce a high power scan line along the entire imaging region simultaneously, as compared with a rastering system that only applies high power to one point of the scan line at any given instant. In addition, because the relatively low power homogenous light is spread over the large number of modulating elements, the present invention can be produced using low-cost, commercially available spatial light modulating devices, such as digital micromirror (DMD) devices, electro-optic diffractive modulator arrays, or arrays of thermo-optic absorber elements.

According to an embodiment of the present invention, the arrayed light modulating elements of the spatial light modulator are arranged in rows and columns, and the anamorphic optical system is arranged to concentrate light portions received from each column onto an associated imaging region ("pixel") of the elongated scan line image. That is, the concentrated modulated light portions received from all of the light modulating elements in a given column (and in the "on" modulated state) are directed by the anamorphic optical system onto the same corresponding imaging region of the scan line image so that the resulting imaging "pixel" is the composite light from all light modulating elements in the given column that are in the "on" state. A key aspect of the present invention lies in understanding that the light portions passed by each light modulating element represent one pixel of binary data that is delivered to the scan line by the anamorphic optical system, so that the brightness of each imaging "pixel" making up the scan line image is controlled by the number of elements in the associated column that are in the "on" state. Accordingly, by individually controlling the multiple modulating elements disposed in each column, and by concentrating the light passed by each column onto a corresponding imaging region, the present invention provides an imaging system having gray-scale capabilities using constant (non-modulated) homogenous light. In addition, if the position of a group of "on" pixels in each column is adjusted up or down the column, this arrangement facilitates software electronic compensation of bow (i.e. "smile" of a straight line) and skew.

According to an embodiment of the present invention, the homogenous light generator includes one or more light sources and a light homogenizer optical system for homogenizing light beams generated by the light sources. High power laser light homogenizers are commercially available from several companies including Lissotschenko Mikrooptik also known as LIMO GmbH located in Dortmund, Germany. One benefit of converting a point source high intensity light beams (i.e., light beams having a first, relatively high flux density) to relatively low intensity homogenous light source (i.e., light having a second flux density that is lower than the flux density of the high energy beam) in this manner is that this arrangement facilitates the use of a high energy light source (e.g., a laser or light emitting diode) without requiring the construction of spatial light modulator using special optical glasses and antireflective coatings that can handle the high energy light. That is, by utilizing a homogenizer to spread the high energy laser light out over an extended two-dimensional area, the intensity (Watts/cc) of the light over a given area (e.g., over the area of each modulating element) is reduced to an acceptable level such that low cost optical glasses and antireflective coatings can be utilized to form spatial light modulator with improved power handling capabilities. Spreading the light uniformly out also eliminates the negatives imaging effects that point defects (e.g., microscopic dust particles or scratches) have on total light transmission losses.

According to alternative embodiments of the present invention, the light source of the homogenous light generator includes multiple low power light generating elements that collectively produce the desired light energy. In one specific embodiment, the light sources (e.g., edge emitting laser diodes or light emitting diodes) are arranged along a line that is parallel to the rows of light modulating elements. In another specific embodiment, the light sources (e.g., vertical cavity surface emitting lasers (VCSELs)) are arranged in a two-dimensional array. For high power homogenous light applications, the light source is preferably composed of multiple lower power light sources whose light emissions are mixed together by the homogenizer optics and produce the desired high power homogenous output. An additional benefit of using several independent light sources is that laser speckle due to coherent interference is reduced.

According to another embodiment of the present invention, the overall anamorphic optical system includes a cross-process optical subsystem and a process-direction optical subsystem that concentrate the modulated light portions received from the spatial light modulator such that the concentrated modulated light forms the substantially one-dimensional scan line image, wherein the concentrated modulated light at the scan line image has a higher optical intensity (i.e., a higher flux density) than that of the homogenized light. By anamorphically concentrating (focusing) the two-dimensional modulated light pattern to form a high energy elongated scan line, the imaging system of the present invention outputs a higher intensity scan line. The scan line is usually directed towards and swept over a moving imagine surface near its focus. This allows an imaging system to be formed such as a printer. The direction of the surface sweep is usually perpendicular to the direction of the scan line and is customarily called the process direction. In addition, the direction parallel to the scan line is customarily called the cross-process direction. The scan line image formed may have different pairs of cylindrical or acylindrical lens that address the converging and tight focusing of the scan line image along the process direction and the projection and magnification of the scan line image along the cross-process direction. In one specific embodiment, the cross-process optical subsystem includes first and second cylindrical or acylindrical lenses arranged to project and magnify the modulated light onto the elongated scan line in a cross-process direction, and the process-direction optical subsystem includes a third cylindrical or acylindrical focusing lens arranged to concentrate and demagnify the modulated light on the scan line in a direction parallel to a process direction. This arrangement facilitates generating a wide scan line that can be combined ("stitched" or blended together with a region of overlap) with adjacent optical systems to produce an assembly having a substantially unlimited length scan line. An optional collimating field lens may also be disposed between the spatial light modulator and cylindrical or acylindrical focusing lens in both the process and cross-process direction. It should be understood that the overall optical system may have several more elements to help compensate for optical aberrations or distortions and that such optical elements may be transmissive lenses or reflective mirror lenses with multiple folding of the beam path.

According to a specific embodiment of the present invention, the spatial light modulator comprises a DLP™ chip from Texas Instruments, referred to as a Digital Light Processor in the packaged form. The semiconductor chip itself is often referred to as a Digital Micromirror Device or DMD. This DMD includes an two dimensional array of microelectromechanical (MEMs) mirror mechanisms disposed on a substrate, where each MEMs mirror mechanism includes a mirror that is movably supported between first and second tilted positions according to associated control signals generated by a controller. The spatial light modulator and the anamorphic optical system are positioned in a folded arrangement such that, when each mirror is in the first tilted position, the mirror reflects its associated received light portion toward the anamorphic optical system, and when the mirror is in the second tilted position, the mirror reflects the associated received light portion away from the anamorphic optical system towards a beam dump. An optional heat sink is fixedly positioned relative to the spatial light modulator to receive light portions from mirrors disposed in the second tilted position towards the beam dump. An optional frame is utilized to maintain each of the components in fixed relative position. An advantage of a reflective DMD-based imaging system is that the folded optical path arrangement facilitates a compact system footprint.

According to another specific embodiment of the present invention, an assembly includes multiple imaging systems, where each imaging systems includes means for generating homogenous light such that the homogenous light forms a substantially uniform two-dimensional homogenous light field, means for modulating portions of the homogenous light in accordance with the predetermined scan line image data such that the modulated light portions form a two-dimensional modulated light field, and means for anamorphically concentrating the modulated light portions along the process direction and anamorphically projecting with magnification the light field along the cross-process direction such that the concentrated modulated light portions form an elongated scan line image. Under this arrangement, multiple imaging systems can be situated side by side to form a substantially collinear "macro" single long scan line image scalable to lengths well over twenty inches. This arrangement allows for the entire system to sweep a variable optical pattern over an imaging substrate in a single pass without any staggering or time delays during the sweep between each imaging system subunit. In a specific embodiment, the spatial light modulator of each system is a DMD device, and the anamorphic optical system is positioned in the folded arrangement described above. Another advantage of the DMD-based imaging system is that the folded arrangement facilitates combining multiple imaging systems to produce a scan line in excess of 20" using presently available DMD devices. It should also be understood that each scan-line that is stitched together need not be directed exactly normal to the same focal plane imaging surface, i.e. the optical paths need not be collinear between adjacent subsystems. In fact in order to facilitate more room for the body of each individual optical system, it is possible for the scan line to be received from each adjacent subsystem at small interlaced angles.

According to yet another embodiment of the present invention, the spatial light modulator is slightly rotated at a small angle relative to the cross-process and process orthogonal directions of the anamorphic optical system such that the rows of modulating elements are aligned at a small acute tilt angle relative to the scan line image, whereby the anamorphic optical system focuses each modulated light portion onto an associated sub-imaging region of the scan line image. The benefit of this tilted orientation is that imaging system produces a higher sub-pixel spatial addressable spacing and provides an opportunity to utilize software to position image "pixels" with fractional precision in both the X-axis and Y-axis directions. The spatial light modulator is optionally set at a tilt angle that produces an alignment of each imaging region with multiple elements disposed in different columns of the array, thereby facilitating variable resolution and variable intensity. This arrangement also facilitates software adjustment seamlessly stitching between adjacent imaging subunits.

According to another embodiment of the present invention, a scanning/printing apparatus includes the single-pass imaging system described above, and a scan structure (e.g., an imaging drum cylinder) that is disposed to receive the concentrated modulated light from the anamorphic optical system. According to a specific embodiment, the imaging surface may be one that holds a damping (fountain) solution such as is used for variable data lithographic printing.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to improvements in imaging systems and related apparatus (e.g., scanners and printers). The following description is presented to enable one of ordinary skill in the art to make and use the invention as provided in the context of a particular application and its requirements. As used herein, directional terms such as “upper”, “uppermost”, “lower”, and “front”, are intended to provide relative positions for purposes of description, and are not intended to designate an absolute frame of reference. In addition, the phrases “integrally connected” and “integrally attached” are used herein to describe the connective relationship between two portions of a single molded or machined structure, and are distinguished from the terms “connected” or “coupled” (without the modifier “integrally”), which indicates two separate structures that are joined by way of, for example, adhesive, fastener, clip, or movable joint. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
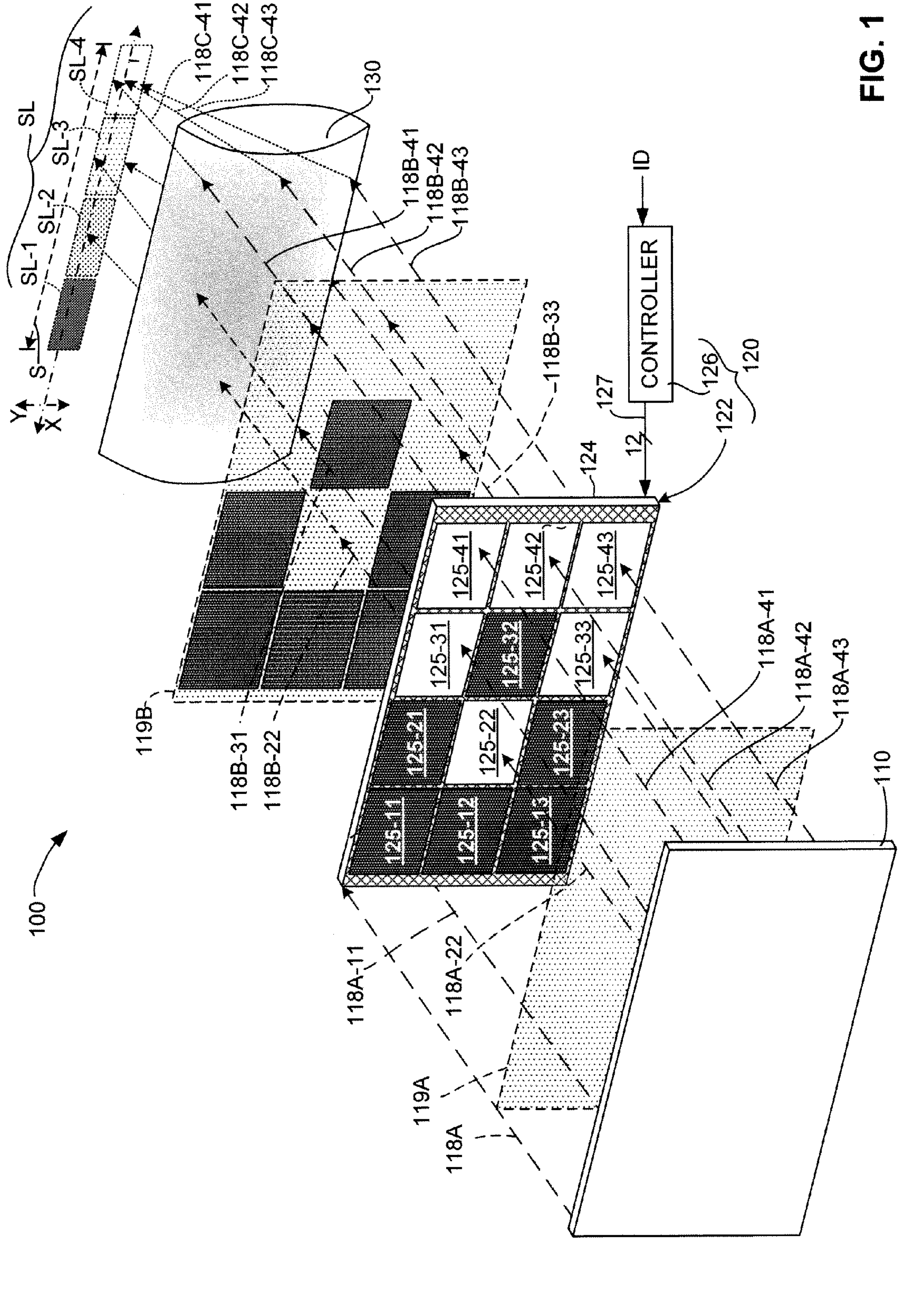
FIG. 1 is a top side perspective view showing a generalized imaging system according to an exemplary embodiment of the present invention.

FIG. 1 is a perspective view showing a single-pass imaging system 100 according to a simplified exemplary embodiment of the present invention. Imaging system 100 generally includes a homogenous light generator 110, a spatial light modulator 120, and an anamorphic optical system 130 represented for the purposes of simplification in FIG. 1 by a single generalized anamorphic projection lens. In practice anamorphic system 130 is typically composed of multiple separate cylindrical or acylindrical lenses, such as described below with reference to FIGS. 4(A), 4(B) and 15.

Referring to the lower left portion of FIG. 1, homogenous light generator 110 serves to generate continuous (i.e., constant/non-modulated) homogenous light 118A that forms a substantially uniform two-dimensional homogenous light field 119A. That is, homogenous light generator 110 is formed such that all portions of homogenous light field 119A, which is depicted by the projected dotted rectangular box (i.e., homogenous light field 119A does not form a structure), receive light energy having substantially the same constant energy level (i.e., substantially the same flux density). As set forth in additional detail below, homogenous light generator 110 is implemented using any of several technologies, and is therefore depicted in a generalized form in FIG. 1.

Referring to the center left portion of FIG. 1, spatial light modulator 120 is disposed in homogenous light field 119A, and serves the purpose of modulating portions of homogenous light 118A in accordance with predetermined scan line image data ID, whereby spatial light modulator 120 generates a modulated light field 119B that is projected onto anamorphic optical system 130. In a practical embodiment such a spatial light modulator can be purchased commercially and would typically have two-dimensional (2D) array sizes of 1024×768 (SVGA resolution) or higher resolution with light modulation element (pixel) spacing on the order of 5-20 microns. For purposes of illustration, only a small subset of light modulation elements is depicted in FIG. 1. Spatial light modulator 120 includes a modulating array 122 made up of modulating elements 125-11 to 125-43 disposed in a two dimensional array on a support structure 124, and a control circuit (controller) 126 for transmitting control signals 127 to modulating elements 125-11 to 125-43 in response to scan line image data ID. Modulating elements 125-11 to 125-43 are disposed such that a light modulating structure (e.g., a mirror, a diffractive element, or a thermo-optic absorber element) of each modulating element receives a corresponding portion of homogenous light 118A (e.g., modulating elements 125-11 and 125-22 respectively receive homogenous light portions 118A-11 and 118A-22), and is positioned to selectively pass or redirect the received corresponding modulated light portion along a predetermined direction toward anamorphic optical system 130 (e.g., modulating element 125-22 passes modulated light portion 118B-22 to anamorphic optical system 130, but 125-11 blocks light from reaching anamorphic optical system 130). In particular, each light modulating element 125-11 to 125-43 is individually controllable to switch between an “on” (first) modulated state and an “off” (second) modulated state in response to associated portions of scan line image data ID. When a given modulating element (e.g., modulating element 125-43) is in the “on” modulated state, the modulating element is actuated to direct the given modulating element’s associated received light portion toward anamorphic optic 130. For example, in the simplified example, modulating element 125-43 is rendered transparent or otherwise controlled in response to the associated control signal such that modulated light portion 118B-43, which is either passed, reflected or otherwise produced from corresponding homogenous light portion 118A-43, is directed toward anamorphic optic 130. Similarly, modulating elements 125-41 and 125-42 are rendered transparent or otherwise controlled to produce modulated light portions 118B-41 and 118B-42 from corresponding homogenous light portions 118A-41 and 118A-42. Conversely, when a given modulating element (e.g., modulating element 125-11) is in the "off" modulated state, the modulating element is actuated to prevent (e.g., block or redirect) the given modulating element's associated received light portion (e.g., light portion 118A-11) from reaching anamorphic optic 130. By selectively turning "on" or "off" modulating elements 125-11 to 125-43 in accordance with image data supplied to controller 126 from an external source (not shown), spatial light modulator 120 serves to modulate (i.e., pass or not pass) portions of continuous homogenous light 118A such that a two-dimensional modulated light field 119B is generated that is passed to anamorphic optical system 130. As set forth in additional detail below, spatial light modulator 120 is implemented using any of several technologies, and is therefore not limited to the linear "pass through" arrangement depicted in FIG. 1.

Referring to the center right portion of FIG. 1, anamorphic optical system 130 serves to anamorphically concentrate (focus) the modulated light portions, which are received from spatial light modulator 120 by way of two-dimensional light field 119B, onto an elongated scan line SL having a width S (i.e., measured in the X-axis direction indicated in FIG. 1). In particular, anamorphic optical system 130 includes one or more optical elements (e.g., lenses or mirrors) that are positioned to receive the two-dimensional pattern of light field 119B that are directed to anamorphic optical system 130 from spatial light modulator 120 (e.g., modulated light portion 118B-43 that is passed from modulating element 125-43), where the one or more optical elements (e.g., lenses or mirrors) are arranged to concentrate the received light portions to a greater degree along the non-scan (e.g., Y-axis) direction than along the scan (X-axis) direction, whereby the received light portions are anamorphically focused to form an elongated scan line image SL that extends parallel to the scan (X-axis) direction. For example, light portions 118B-41, 118B-42 and 118B-43 are concentrated by anamorphic optical system 130 to form concentrated light portions 118C-41, 118C-42 and 118C-43 that anamorphically focused as elongated scan line image portion SL-4. As set forth in additional detail below, anamorphic optical system 130 is implemented using any of several optical arrangements, and is therefore not limited to the generalized lens depicted in FIG. 1.

According to an aspect of the present invention, light modulating elements 125-11 to 125-43 of spatial light modulator 120 are disposed in a two-dimensional array 122 of rows and columns, and anamorphic optical system 130 is arranged to concentrate light portions passed through each column of modulating elements on to each imaging region SL-1 to SL-4 of scan line image SL. As used herein, each "column" includes light modulating elements arranged in a direction that is substantially perpendicular to scan line image SL (e.g., light modulating elements 125-11, 125-12 and 125-13 are disposed in the leftmost column of array 122), and each "row" includes light modulating elements arranged in a direction substantially parallel to scan line image SL (e.g., light modulating elements 125-11, 125-21, 125-31 and 125-41 are disposed in the uppermost row of array 122). In the simplified arrangement shown in FIG. 1, any light passed through elements 125-11, 125-12 and 125-13 is concentrated by anamorphic optical system 130 onto imaging region SL-1, any light passed through elements 125-21, 125-22 and 125-23 is concentrated onto imaging region SL-2, any light passed through elements 125-31, 125-32 and 125-33 is concentrated onto imaging region SL-3, and any light passed through elements 125-41, 125-42 and 125-43 is concentrated onto imaging region SL-4.

According to another aspect of the present invention, grayscale imaging is achieved by controlling the on/off states of selected modulating elements in each column of array 122. That is, the brightness (or darkness) of the "spot" formed on each imaging region SL-1 to SL-4 is controlled by the number of light modulating elements that are turned "on" in each associated column. For example, referring to the imaging regions located in the upper right portion of FIG. 1, all of light modulating elements 125-11, 125-12 and 125-13 disposed in the leftmost column of array 122 are turned "off", whereby image region SL-1 includes a "black" spot, as depicted in the upper right portion of FIG. 1. In contrast, all of light modulating elements 125-41, 125-42 and 125-43 disposed in the rightmost column of array 122 are turned "on", whereby light portions 118B-41, 118B-42 and 118B-43 pass from spatial light modulator 120 and are concentrated by anamorphic optical system 130 such that imaging region SL-4 includes a maximum brightness ("white") spot. The two central columns are controlled to illustrate gray scale imaging, with modulating elements 125-21 and 125-23 turned "off" and modulating element 125-22 turned "on" to pass a single light portion 118B-23 that forms a "dark gray" spot on imaging region SL-2, and modulating elements 125-31 and 125-33 turned "on" with modulating element 125-32 turned "off" to pass two modulated light portions 118B-31 and 118B-33 that form a "light gray" spot on imaging region SL-3. One key to this invention lies in understanding the light portions passed by each light modulating element represent one pixel of binary data that is delivered to the scan line by anamorphic optical system 130, so that brightness of each imaging pixel of the scan line is determined by the number of light portions (binary data bits) that are directed onto the corresponding imaging region. Modulated light portions directed from each row (e.g., elements 125-11 to 125-41) are summed with light portions directed from the other rows such that the summed light portions are wholly or partially overlapped to produce a series of composite energy profiles at imaging regions (scan line image segments) SL-1 to SL-4. Accordingly, by individually controlling the multiple modulating elements disposed in each column of array 122, and by concentrating the light passed by each column onto a single image region, the present invention provides an imaging system having gray-scale capabilities that utilizes the constant (non-modulated) homogenous light 118A generated by homogenous light generator 110.

Note that the simplified spatial light modulator 120 shown in FIG. 1 includes only three modulating elements in each column for descriptive purposes, and those skilled in the art will recognize that increasing the number of modulating elements disposed in each column of array 122 would enhance gray scale control by facilitating the production of spots exhibiting additional shades of gray. In one preferred embodiment at least 24 pixels are used in one column to adjust grayscale, thus allowing for single power adjustments in scan line segments of at close to 4%.

A large number of modulating elements in each column of array 122 also facilitates the simultaneous generation of two or more scan lines within a narrow swath. Yet another benefit to providing a large number of light modulating elements in each column is that this arrangement would allows for one or more "reserve" or "redundant" elements that are only activated when one or more of the regularly used elements malfunctions, thereby extending the operating life of the imaging system or allowing for corrections to optical line distortions such as bow (also known as line smile).

Figure 2A:
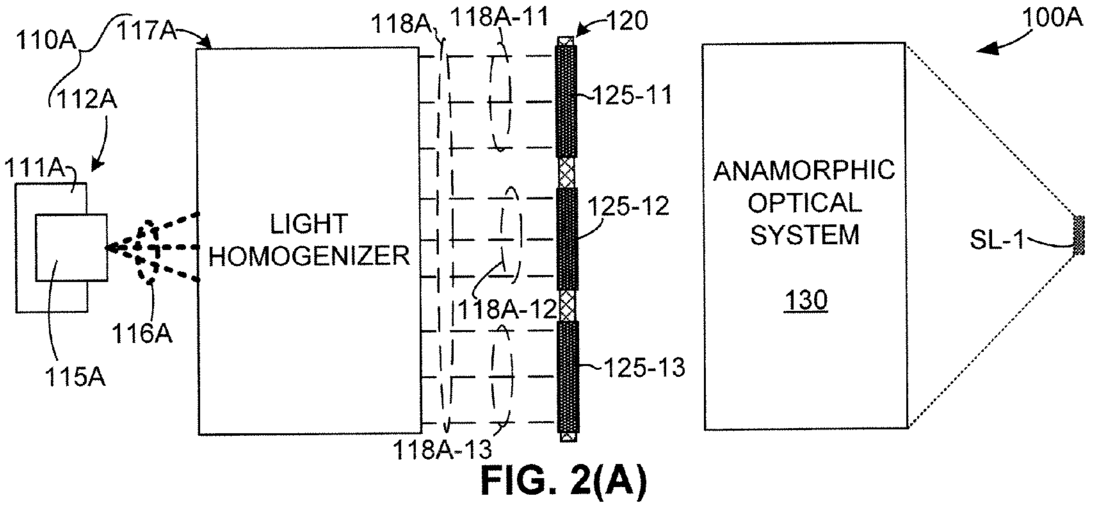
FIGS. 2(A), 2(B) and 2(C) are simplified side views showing an imaging system 100A according to an embodiment of the present invention during operation.
Figure 2B:
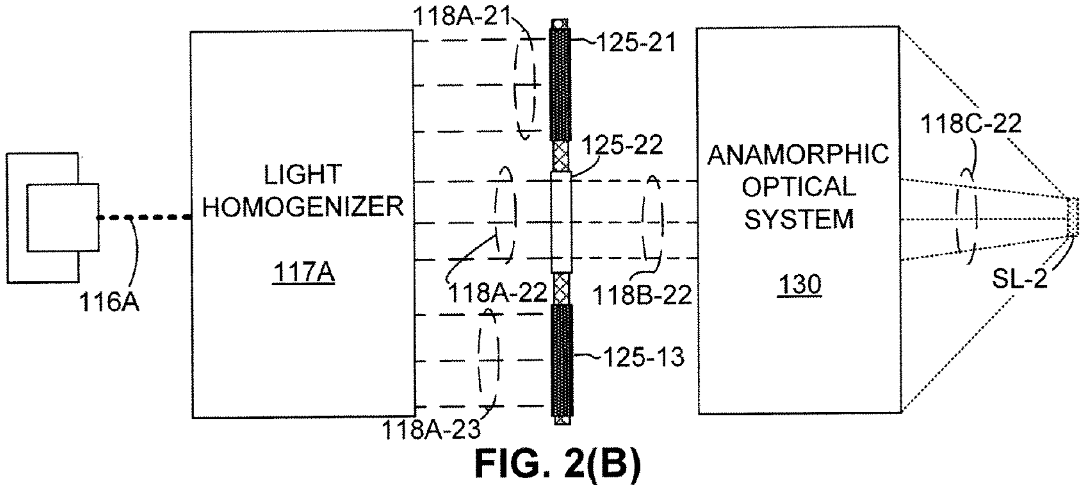
Figure 2C:
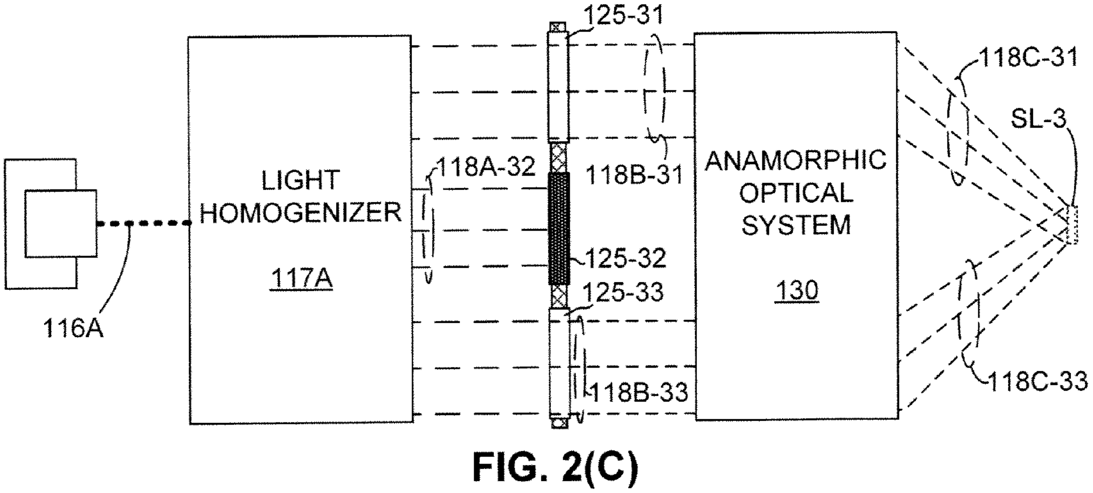

FIGS. 2(A) to 2(C) are simplified side views showing an imaging system 100A according to an embodiment of the present invention. Referring to FIG. 2(A), imaging system 100A includes a homogenous light generator 110A made up of a light source 112A including a light generating element (e.g., one or more lasers or light emitting diode) 115A fabricated or otherwise disposed on a suitable carrier (e.g., a semiconductor substrate) 111A, and a light homogenizing optical system (homogenizer) 117A that produces homogenous light 118A by homogenizing light beam 116A (i.e., mixing and spreading out light beam 116A over an extended two-dimensional area) as well as reducing the divergences of the output rays. Those skilled in the art will recognize that this arrangement effectively converts the concentrated, relatively high energy intensity high divergence of light beam 116A into dispersed, relatively low energy flux homogenous light 118A that is substantially evenly distributed onto modulating elements 125-11, 125-12 and 125-13 of spatial light modulator 120.

One benefit of converting high energy beam 116A to relatively low energy homogenous light 118A in this manner is that this arrangement facilitates the use of a high energy light source (e.g., a laser) to generate beam 116A without requiring the construction of spatial light modulator 120 using special optical glasses and antireflective coatings that can handle the high energy light. That is, by utilizing homogenizer 117A to spread the high energy laser light out over an extended two-dimensional area, the intensity flux density, with units of Watts per square centimeter (Watt/cm$^2$) of the light over a given area (e.g., over the area of each modulating element 125-11 to 125-43) is reduced to an acceptable level such that low cost optical glasses and antireflective coatings can be utilized to form spatial light modulator 120. For example, as indicated in FIG. 2(A), when all of light modulating elements 125-11, 125-12 and 125-13 are turned "off", each of light modulating elements 125-11 to 125-13 is required to absorb or reflect a relatively small portion of low energy homogenous light 118A (i.e., light modulating elements 125-11, 125-12 and 125-13 respectively absorb homogenous light portions 118A-11, 118A-12 and 118A-13). In contrast, in the absence of homogenizer 117A, most of the energy of beam 116A would be concentrated on one or a smaller number of elements, which would require the use of substantially more expensive optical glasses and antireflective coatings.

Another benefit of converting high energy beam 116A to relatively low energy homogenous light 118A is that this arrangement provides improved power handling capabilities. That is, if high energy laser light 116A were passed directly to spatial light modulator 120, then only one or a small number of modulating elements could be used to control how much energy is passed to anamorphic optical system 130 (e.g., substantially all of the energy would be passed if the element was turned "on", or none would be passed if the element was turned "off"). By expanding high energy laser light 116A to provide low energy homogenous light 118A over a wide area, the amount of light energy passed by spatial light modulator 120 to anamorphic optical system 130 is controlled with much higher precision. For example, as indicated in FIG. 2(B), because homogenous light 118A is spread out over light modulating elements 125-21 to 125-23, a small amount of light energy (e.g., homogenous light portion 118A-22/modulated light portion 118B-22) is passed to imaging region SL-2 by turning element 125-22 "on", and leaving elements 125-21 and 125-23 turned "off" (i.e., such that homogenous light portions 118A-21 and 118A-23 are blocked). Similarly, as indicated in FIG. 2(C), a slightly larger amount of light energy (e.g., portions 118B-31 and 118-33) is passed to imaging region SL-3 by turning element 125-32 "off", and turning elements 125-31 and 125-33 "on" (i.e., such that light portions 118A-31/118B-31 and 118A-33/118B-33 are passed, but homogenous light portion 118A-32 is blocked). Spreading the light out also eliminates the negatives imaging effects that point defects (e.g., microscopic dust particles or scratches) have on total light transmission losses.

According to alternative embodiments of the present invention, light source 112A can be composed of a single high power light generating element 115A (e.g., a laser), as depicted in FIG. 2(A)), or composed of multiple low power light generating elements that collectively produce the desired light energy. For high power homogenous light applications, the light source is preferably composed of multiple lower power light sources (e.g., edge emitting laser diodes or light emitting diodes) whose light emissions are mixed together by the homogenizer optics and produce the desired high power homogenous output. An additional benefit of using several independent light sources is that laser speckle due to coherent interference is reduced.

Figure 3A:
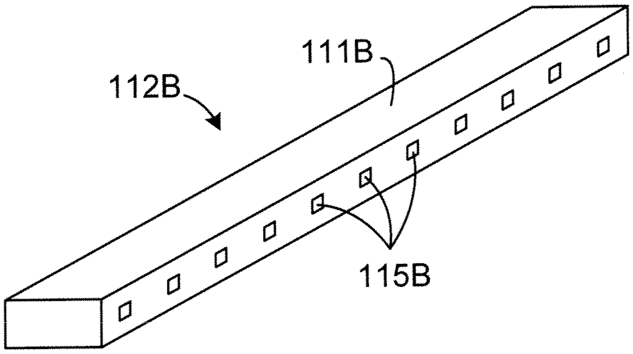
FIGS. 3(A) and 3(B) are simplified perspective views showing alternative light sources utilized by the homogenous light generator of the imaging system of FIG. 1 according to alternative embodiments of the present invention.

FIG. 3(A) illustrates a light source 112B according to a specific embodiment in which multiple edge emitting laser diodes 115B are arranged along a straight line that is disposed parallel to the rows of light modulating elements (not shown). In alternative specific embodiments, light source 112B consists of an edge emitting laser diode bar or multiple diode bars stacked together. These sources do not need to be single mode and could consist of many multimode lasers. Optionally, a fast-axis collimation (FAC) microlens could be used to help collimate the output light from an edge emitting laser.

Figure 3B:
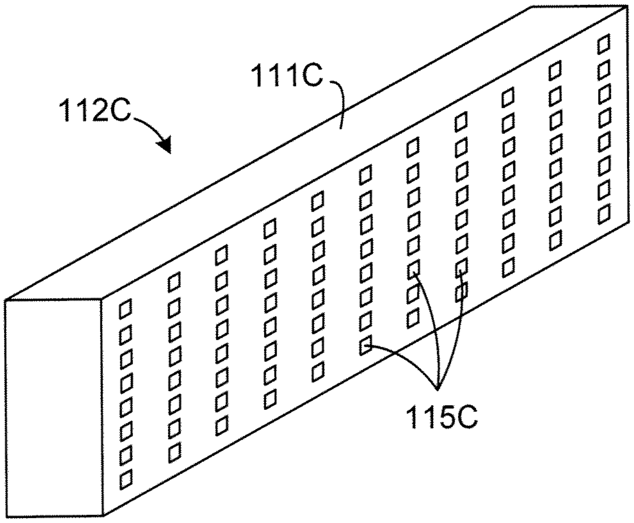

FIG. 3(B) illustrates a light source 112C according to another specific embodiment in which multiple vertical cavity surface emitting lasers (VCSELs) 115C are arranged in a two-dimensional array on a carrier 111C. This two-dimensional array of VCSELS could be stacked in any arrangement such as hexagonal closed packed configurations to maximize the amount of power per unit area. Ideally such laser sources would have high plug efficiencies (e.g., greater than 50%) so that passive water cooling or forced air flow could be used to easily take away excess heat.

Referring again to FIG. 2(A), light homogenizer 117A can be implemented using any of several different technologies and methods known in the art including but not limited to the use of a fast axis concentrator (FAC) lens together with microlens arrays for beam reshaping, or additionally a light pipe approach which causes light mixing within a waveguide.

Figure 4A:
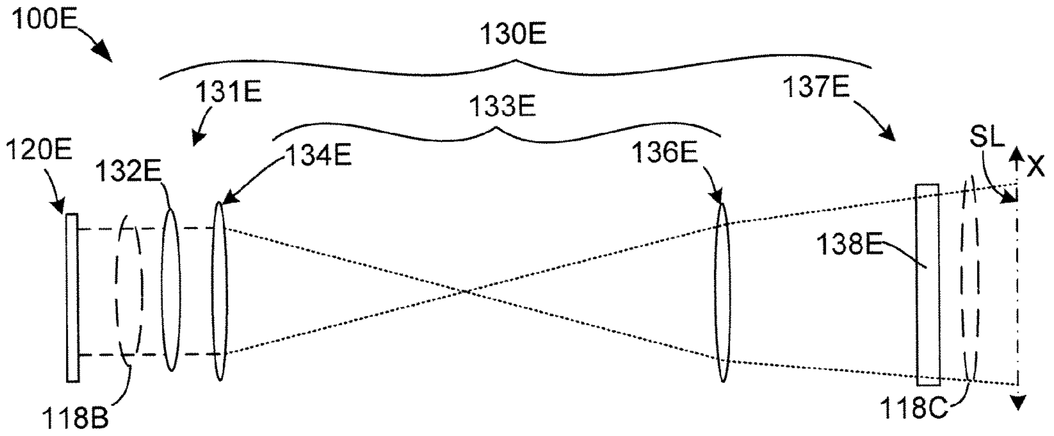
FIGS. 4(A) and 4(B) are simplified top and side views, respectively, showing a multi-lens anamorphic optical system utilized by imaging system of FIG. 1 according to a specific embodiment of the present invention.
Figure 4B:
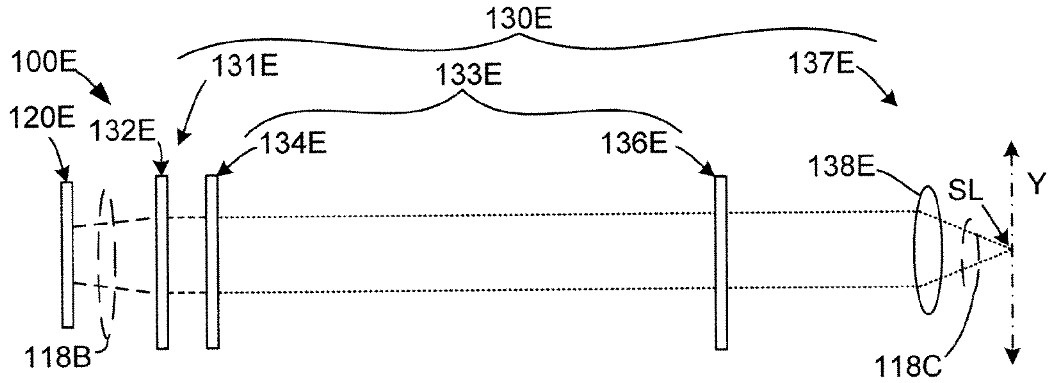

FIGS. 4(A) and 4(B) are simplified diagrams showing a portion of an imaging system 100E including a generalized anamorphic optical system 130E according to an exemplary embodiment of the present invention. Referring to FIG. 4(A), anamorphic optical system 130E includes a collimating optical subsystem 131E, a cross-process optical subsystem 133E, and process-direction optical subsystem 137E according to an exemplary specific embodiment of the present invention. As indicated by the ray traces in FIGS. 4(A) and 4(B), optical subsystems 131E, 133E and 137E are disposed in the optical path between spatial light modulator 120E and scan line SL, which is generated at the output of imaging system 100E. FIG. 4(A) is a top view indicating that collimating optical subsystem 131E and cross-process optical subsystem 133E act on the modulated light portions 118B passed by spatial light modulator 120E to form concentrated light portions 118C on scan line SL parallel to the X-axis (i.e., in the cross-process direction), and FIG. 4(B) is a side view that indicates how collimating optical subsystem 131E and process-direction optical subsystem 137E act on modulated light portions 118B passed by spatial light modulator 1204 and generate concentrated light portions 118C on scan line SL in a direction perpendicular to the Y-axis (i.e., in the process direction).

Collimating optical subsystem 131E includes a collimating field lens 132E formed in accordance with known techniques that is located immediately after spatial light modulator 120E, and arranged to collimate the light portions that are slightly diverging off of the surface of the spatial light modulator 120E. Collimating optical subsystem 131E is optional, and may be omitted when modulated light portions 118B leaving spatial light modulator 120 are already well collimated.

In the disclosed embodiment cross-process optical subsystem 133E is a two-lens cylindrical or acylindrical projection system that magnifies light in the cross-process (scan) direction (i.e., along the X-axis), and process-direction optical subsystem 137E is a cylindrical or acylindrical single focusing lens subsystem that focuses light in the process (cross-scan) direction (i.e., along the Y-axis). The advantage of this arrangement is that it allows the intensity of the light (e.g., laser) power to be concentrated on scan line SL located at the output of single-pass imaging system 100E. Two-lens cylindrical or acylindrical projection system 133E includes a first cylindrical or acylindrical lens 134E and a second cylindrical or acylindrical lens 136E that are arranged to project and magnify modulated light portions (imaging data) 118B passed by spatial light modulator 120E (and optional collimating optical subsystem 131E) onto an imaging surface (e.g., a cylinder) in the cross process direction. As described in additional detail below, by producing a slight fanning out (spreading) of concentrated light portions 118C along the X-axis as indicated in FIG. 4(A) allows the output image to be stitched together without mechanical interference from adjacent optical subsystems. Lens subsystem 137E includes a third cylindrical or acylindrical lens 138E that concentrates the projected imaging data down to a narrow high resolution line image on scan line SL. As the focusing power of lens 138E is increased, the intensity of the light on spatial light modulator 120E is reduced relative to the intensity of the line image generated at scan line SL. However, this means that cylindrical or acylindrical lens 138E must be placed closer to the process surface (e.g., an imaging drum) with a clear aperture extending to the very edges of lens 138E.

According to alternative embodiments of the present invention, the spatial light modulator is implemented using commercially available devices including a digital micromirror device (DMD), such as a digital light processing (DLP®) chip available from Texas Instruments of Dallas Tex., USA, an electro-optic diffractive modulator array such as the Linear Array Liquid Crystal Modulator available from Boulder Nonlinear Systems of Lafayette, Colo., USA, or an array of thermo-optic absorber elements such as Vanadium dioxide reflective or absorbing mirror elements. Other spatial light modulator technologies may also be used. While any of a variety of spatial light modulators may be suitable for a particular application, many print/scanning applications today require a resolution 1200 dpi and above, with high image contrast ratios over 10:1, small pixel size, and high speed line addressing over 30 kHz. Based on these specifications, the currently preferred spatial light modulator is the DLP™ chip due to its best overall performance.

Figure 5:
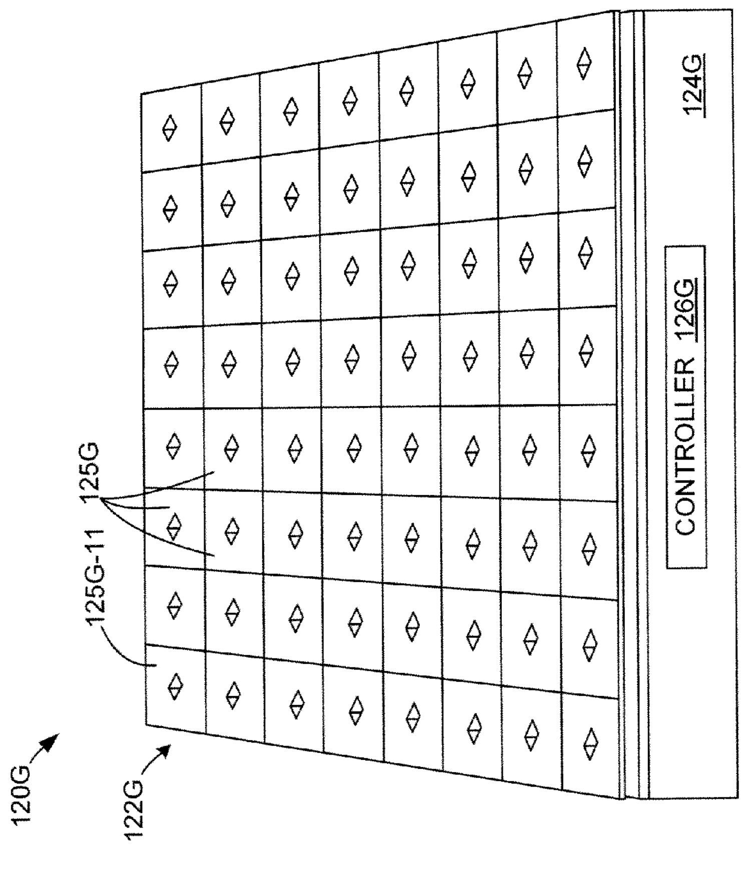
FIG. 5 (PRIOR ART)
FIG. 5 is a perspective view showing a portion of a DMD-type spatial light modulator utilized by imaging system of FIG. 1 according to a specific embodiment of the present invention.

FIG. 5 is a perspective view showing a portion of a DMD-type spatial light modulator 120G including a modulating element array 122G made up of multiple microelectromechanical (MEMs) mirror mechanisms 125G. DMD-type spatial light modulator 120G is utilized in accordance with a specific embodiment of the present invention. Modulating element array 122G is consistent with DMDs sold by Texas Instruments, wherein MEMs mirror mechanisms 125G are arranged in a rectangular array on a semiconductor substrate (i.e., "chip" or support structure) 124G. Mirror mechanism 125G are controlled as described below by a controller circuit 126G that also is fabricated on substrate 124G according to known semiconductor processing techniques, and is disposed below mirrors 125G. Although only sixty-four mirror mechanisms 125G are shown in FIG. 5 for illustrative purposes, those skilled in the art will understand that any number of mirror mechanisms are disposed on DMD-type modulating element array 122G, and that DMDs sold by Texas Instruments typically include several hundred thousand mirrors per device.

Figure 6:
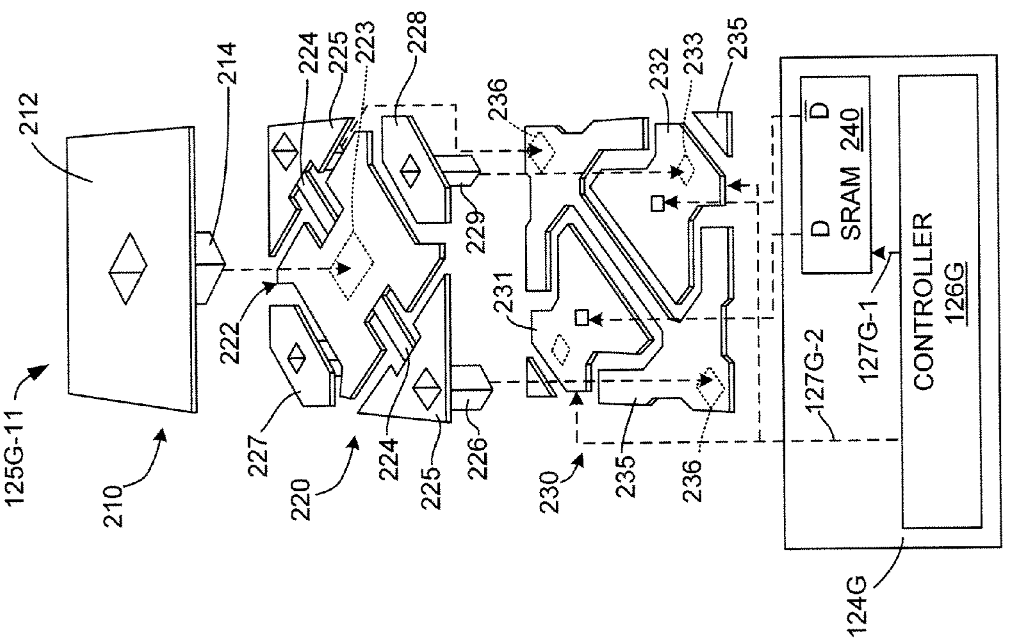
FIG. 6 (PRIOR ART)
FIG. 6 is an exploded perspective view showing a light modulating element of the DMD-type spatial light modulator of FIG. 5 in additional detail.

FIG. 6 is a combination exploded perspective view and simplified block diagram showing an exemplary mirror mechanism 125G-11 of DMD-type modulating element array 122G (see FIG. 5) in additional detail. For descriptive purposes, mirror mechanism 125G-11 is segmented into an uppermost layer 210, a central region 220, and a lower region 230, all of which being disposed on a passivation layer (not shown) formed on an upper surface of substrate 124G. Uppermost layer 210 of mirror mechanism 125G-11 includes a square or rectangular mirror (light modulating structure) 212 that is made out of aluminum and is typically approximately 16 micrometers across. Central region 220 includes a yoke 222 that connected by two compliant torsion hinges 224 to support plates 225, and a pair of raised electrodes 227 and 228. Lower region 230 includes first and second electrode plates 231 and 232, and a bias plate 235. In addition, mirror mechanism 125G-11 is controlled by an associated SRAM memory cell 240 (i.e., a bi-stable flip-flop) that is disposed on substrate 124G and controlled to store either of two data states by way of control signal 127G-1, which is generated by controller 126G in accordance with image data as described in additional detail below. Memory cell 240 generates complementary output signals D and D-bar that are generated from the current stored state according to known techniques.

Lower region 230 is formed by etching a plating layer or otherwise forming metal pads on a passivation layer (not shown) formed on an upper surface of substrate 124G over memory cell 240. Note that electrode plates 231 and 232 are respectively connected to receive either a bias control signal 127G-2 (which is selectively transmitted from controller 126G in accordance with the operating scheme set forth below) or complementary data signals D and D-bar stored by memory cell 240 by way of metal vias or other conductive structures that extend through the passivation layer.

Central region 220 is disposed over lower region 230 using MEMS technology, where yoke 222 is movably (pivotably) connected and supported by support plates 225 by way of compliant torsion hinges 224, which twist as described below to facilitate tilting of yoke 222 relative to substrate 124G. Support plates 225 are disposed above and electrically connected to bias plate 235 by way of support posts 226 (one shown) that are fixedly connected onto regions 236 of bias plate 235. Electrode plates 227 and 228 are similarly disposed above and electrically connected to electrode plates 231 and 232, respectively, by way of support posts 229 (one shown) that are fixedly connected onto regions 233 of electrode plates 231 and 232. Finally, mirror 212 is fixedly connected to yoke 222 by a mirror post 214 that is attached onto a central region 223 of yoke 222.

Figures 7A, 7B, 7C:
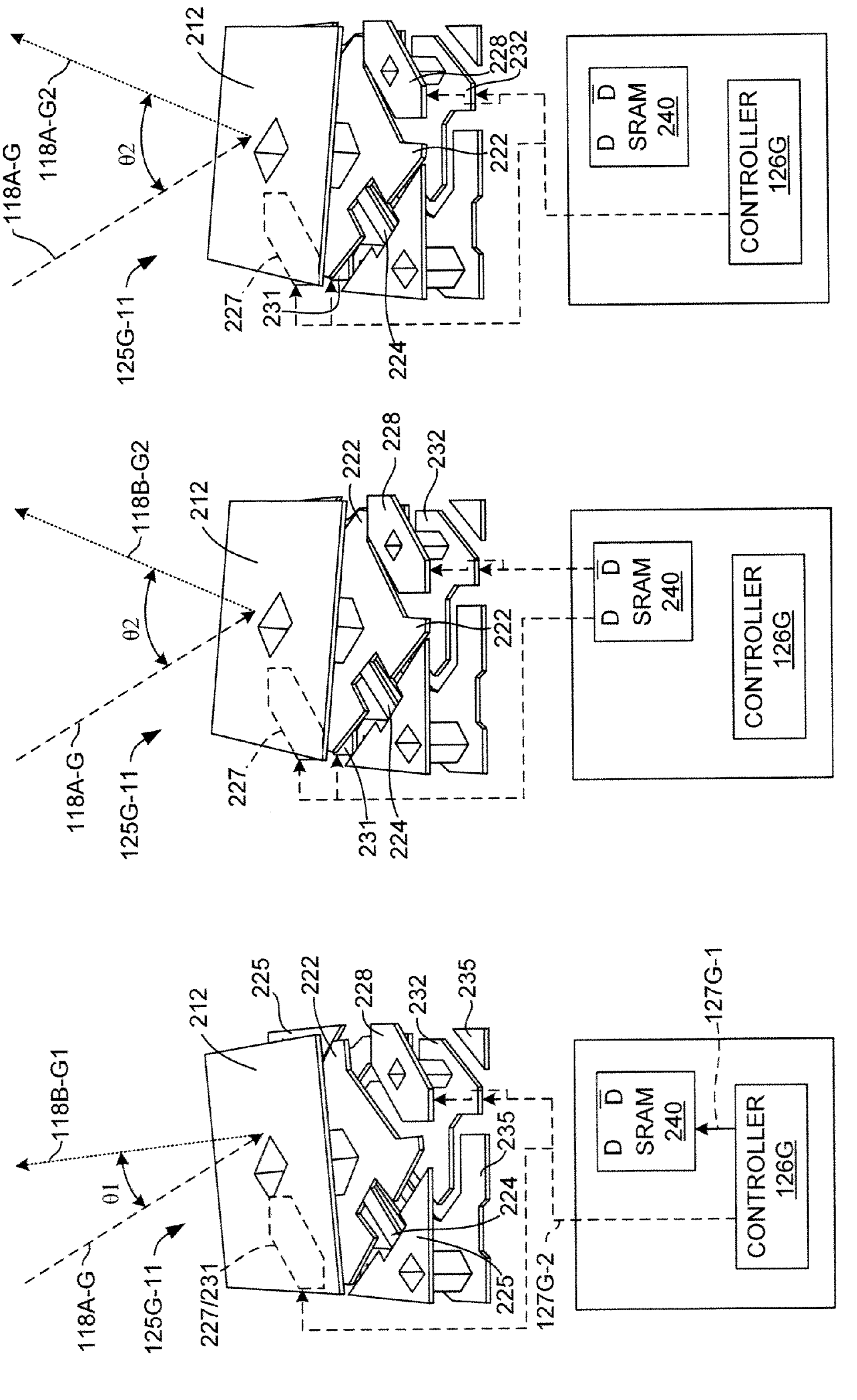
FIGS. 7(A), 7(B) and 7(C) are perspective views showing the light modulating element of FIG. 6 during operation.

FIGS. 7(A) to 7(C) are perspective/block views showing mirror mechanism 125G-11 of FIG. 5 during operation. FIG. 7(A) shows mirror mechanism 125G-11 in a first (e.g., "on") modulating state in which received light portion 118A-G becomes reflected (modulated) light portion 118B-G1 that leaves mirror 212 at a first angle θ1. To set the "on" modulating state, SRAM memory cell 240 stores a previously written data value such that output signal D includes a high voltage (VDD) that is transmitted to electrode plate 231 and raised electrode 227, and output signal D-bar includes a low voltage (ground) that is transmitted to electrode plate 232 and raised electrode 228. These electrodes control the position of the mirror by electrostatic attraction. The electrode pair formed by electrode plates 231 and 232 is positioned to act on yoke 222, and the electrode pair formed by raised electrodes 227 and 228 is positioned to act on mirror 212. The majority of the time, equal bias charges are applied to both sides of yoke 222 simultaneously (e.g., as indicated in FIG. 7(A), bias control signal 127G-2 is applied to both electrode plates 227 and 228 and raised electrodes 231 and 232). Instead of flipping to a central position, as one might expect, this equal bias actually holds mirror 212 in its current on position because the attraction force between mirror 212 and raised electrode 231/electrode plate 227 is greater (i.e., because that side is closer to the electrodes) than the attraction force between mirror 212 and raised electrode 232/electrode plate 228.

To move mirror 212 from the "on" position to the "off" position, the required image data bit is loaded into SRAM memory cell 240 by way of control signal 127G-1 (see the lower portion of FIG. 7(A). As indicated in FIG. 7(A), once all the SRAM cells of array 122G have been loaded with image data, the bias control signal is de-asserted, thereby transmitting the D signal from SRAM cell 240 to electrode plate 231 and raised electrode 227, and the D-bar from SRAM cell 240 to electrode plate 232 and raised electrode 228, thereby causing mirror 212 to move into the "off" position shown in FIG. 7(B), whereby received light portion 118A-G becomes reflected light portion 118B-G2 that leaves mirror 212 at a second angle θ2. In one embodiment, the flat upper surface of mirror 212 tilts (angularly moves) in the range of approximately 10 to 12° between the "on" state illustrated in FIG. 7(A) and the "off" state illustrated in FIG. 7(B). When bias control signal 127G-2 is subsequently restored, as indicated in FIG. 7(C), mirror 212 is maintained in the "off" position, and the next required movement can be loaded into memory cell 240. This bias system is used because it reduces the voltage levels required to address the mirrors such that they can be driven directly from the SRAM cells, and also because the bias voltage can be removed at the same time for the whole chip, so every mirror moves at the same instant.

As indicated in FIGS. 7(A) to 7(C), the rotation torsional axis of mirror mechanism 125G-11 causes mirrors 212 to rotate about a diagonal axis relative to the x-y coordinates of the DLP chip housing. This diagonal tilting requires that the incident light portions received from the spatial light modulator in an imaging system be projected onto each mirror mechanism 125G at a compound incident angle so that the exit angle of the light is perpendicular to the surface of the DLP chip. This requirement complicates the side by side placement of imaging systems.

Figure 8:
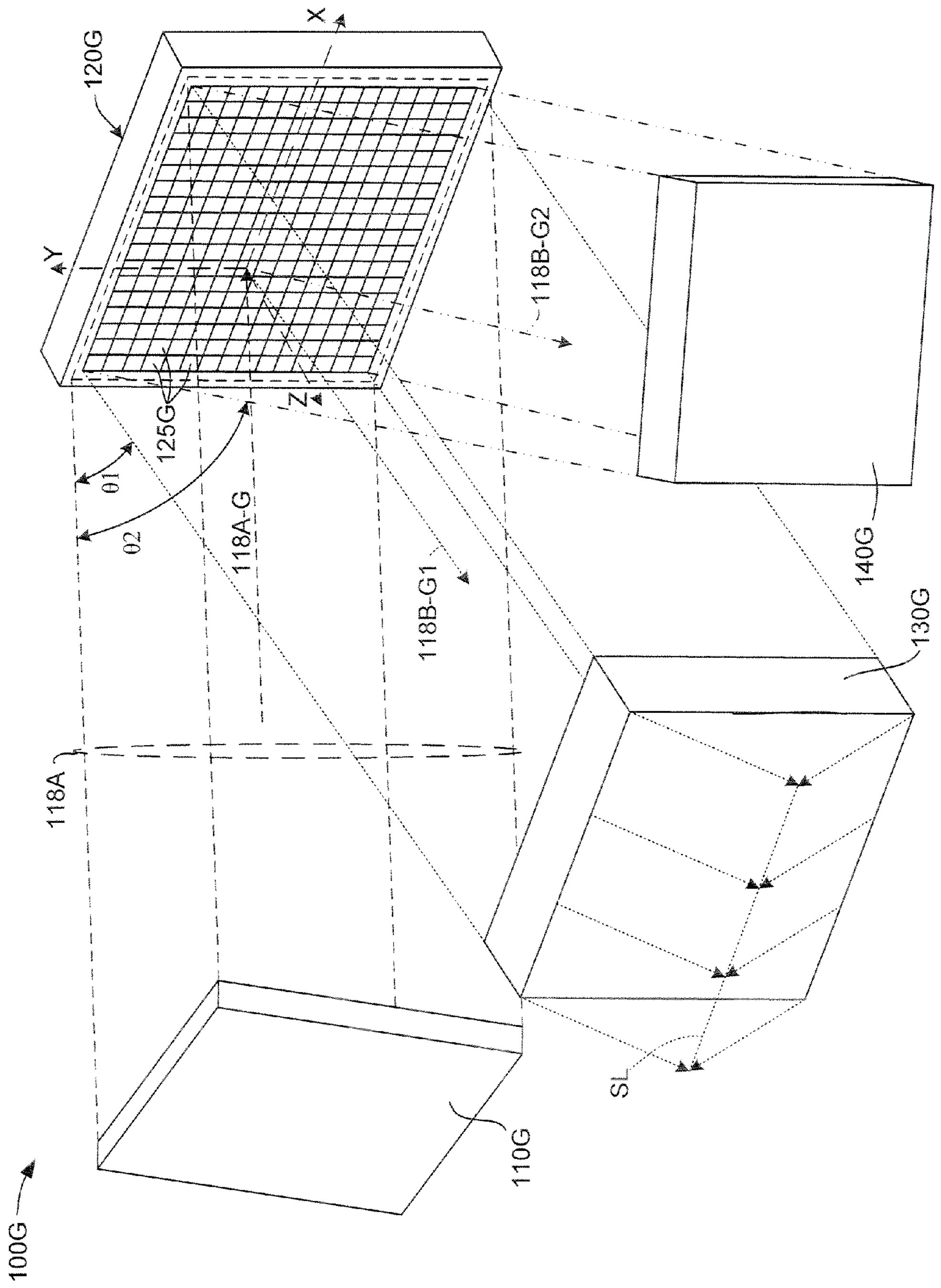
FIG. 8 is a simplified diagram showing a imaging system utilizing the DMD-type spatial light modulator of FIG. 5 in a folded arrangement according to a specific embodiment of the present invention.

FIG. 8 is a simplified perspective view showing an imaging system 100G including DMD-type spatial light modulator 120G disposed in a preferred "folded" arrangement according to another embodiment of the present invention. Similar to the generalized system 100 discussed above with reference to FIG. 1, imaging system 100G includes a homogenous light generator 110G for generating homogenous light 118A and an anamorphic optical system 130G that function and operate as described above, imaging system 100G is distinguished from the generalized system in that spatial light modulator 120G is positioned relative to homogenous light generator 110G and anamorphic optical system 130G at a compound angle such that incident homogenous light portion 118A-G is neither parallel nor perpendicular to any of the orthogonal axes X, Y or Z defined by the surface of spatial light modulator 120G, and neither is reflected light portions 118B-G1 and 118B-G2 (respectively produced when the mirrors are in the "on" and "off" positions). With the components of imaging system 100G positioned in this "folded" arrangement, portions of homogenous light 118A-G directed to spatial light modulator 120G from homogenous light generator 110G are reflected from MEMs mirror mechanism 1250 to anamorphic optical system 130G only when the mirrors of each MEMs mirror mechanism 125G is in the "on" position (e.g., as described above with reference to FIG. 7(A)). That is, as indicated in FIG. 8, each MEMs mirror mechanism 125G that is in the "on" position reflects an associated one of light portions 118B-G1 at angle θ1 relative to the incident light direction, whereby light portions 118B-G1 are directed by spatial light modulator 120G along corresponding predetermined directions to anamorphic optical system 130, which is positioned and arranged to focus light portions 118B-G1 onto scan line SL, where scan line SL is perpendicular to the Z-axis defined by the surface of spatial light modulator 120G. The compound angle between the input rays 118A to the output "on" rays directed towards the anamorphic system 130G (e.g., ray 118B-G1) is typically 22-24 degrees or twice the mirror rotation angle of the DMD chip. Conversely, each MEMs mirror mechanism 125G that is in the "off" position reflects an associated one of light portions 118B-G2 at angle θ2, whereby light portions 118B-G2 are directed by spatial light modulator 120G away from anamorphic optical system 130G. The compound angle between the entrance and "off" rays, θ2 is usually approximately 48 degrees. According to an aspect of the preferred "folded" arrangement, imaging system 100G includes a heat sink structure 140G that is positioned to receive light portions 118B-G2 that are reflected by MEMs mirror mechanisms 125G in the "off" position. According to another aspect of the preferred "folded" arrangement using the compound incident angle design set forth above, the components of imaging system 100G are arranged in a manner that facilitates the construction of a seamless assembly including any number of identical imaging systems, such as described below with reference to FIG. 13.

Figure 9:
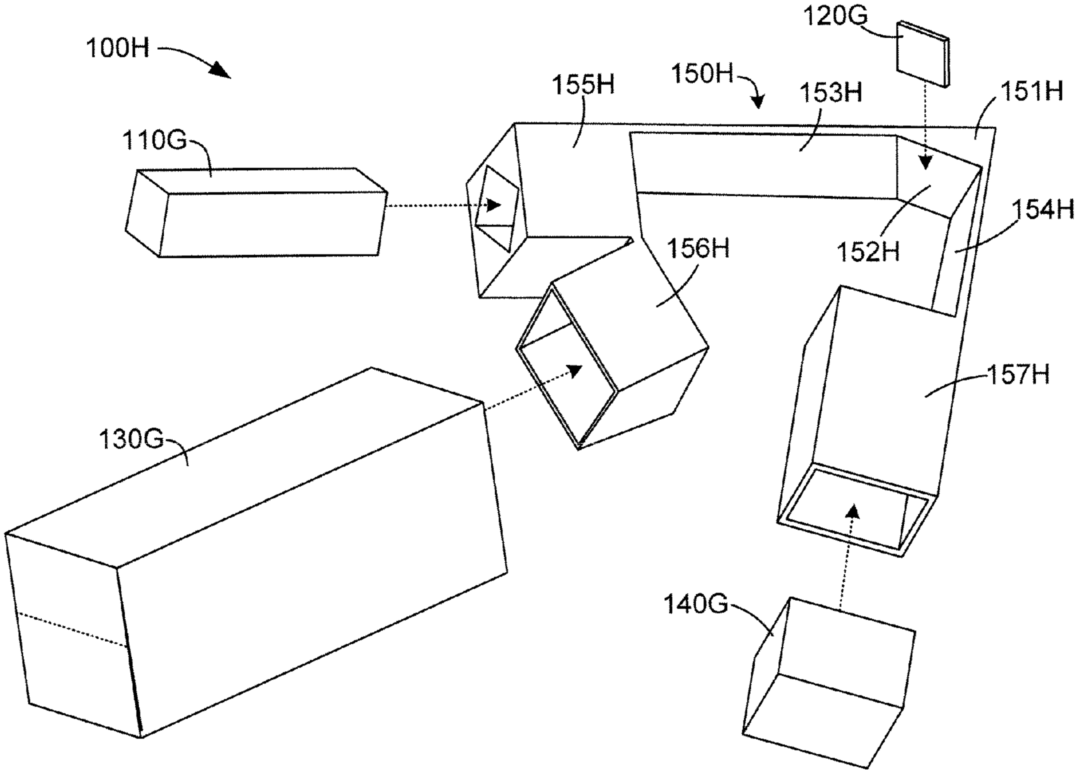
FIG. 9 is an exploded perspective view showing another imaging system utilizing the DMD-type spatial light modulator in the folded arrangement according to another specific embodiment of the present invention.
Figure 10:
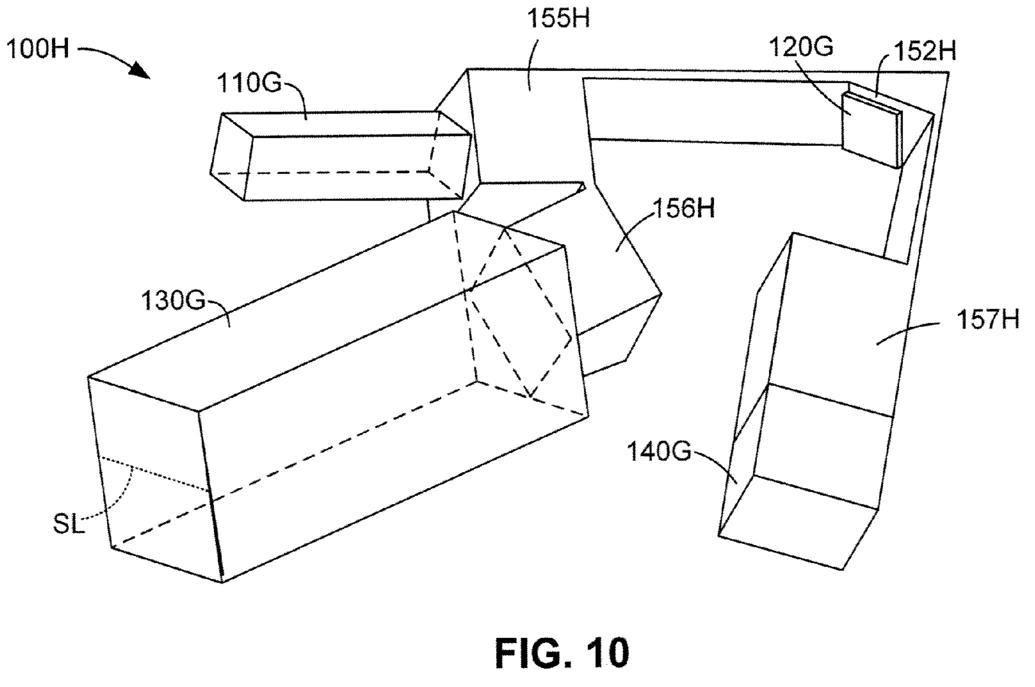
FIG. 10 is a perspective view showing the imaging system of FIG. 9 in an assembled state.

FIGS. 9 and 10 are simplified exploded and assembled perspective views, respectively, showing an imaging system 100H including the components of the system shown in FIG. 8, and further including a rigid frame 150H according to another embodiment of the present invention. The purpose of frame 150H is to facilitate low-cost assembly and to maintain the system components in the preferred "folded" arrangement (discussed above with reference to FIG. 8). In addition, as discussed below with reference to FIG. 11, the disclosed design of frame 150H facilitates utilizing each imaging system 100H as a subsystem of a larger assembly.

Referring to FIG. 9, frame 150H is a single piece structure that is molded or otherwise formed from a rigid material with suitable thermal conductivity such as cast metal, and generally includes an angled base portion 151H defining a support area 152H, a first arm 153H and a second arm 154H that extend from base portion on opposite sides of support area 152H, a first box-like bracket 155H integrally attached to an end of first arm 153H, a second box-like bracket 156H integrally attached to first bracket 155H, and a third bracket 157H attached to an end of second arm 153H. As indicated in FIGS. 9 and 10, support area 152H is shaped and arranged to facilitate mounting of DMD-type spatial light modulator 120G in a predetermined orientation, and brackets 155H, 156H and 157H are positioned and oriented to receive operating ends of homogenous light generator 110G, anamorphic optical system 130G and heat sink 140G, respectively, such that these elements are properly oriented with DMD-type spatial light modulator 120G when fixedly secured thereto.

Figure 11:
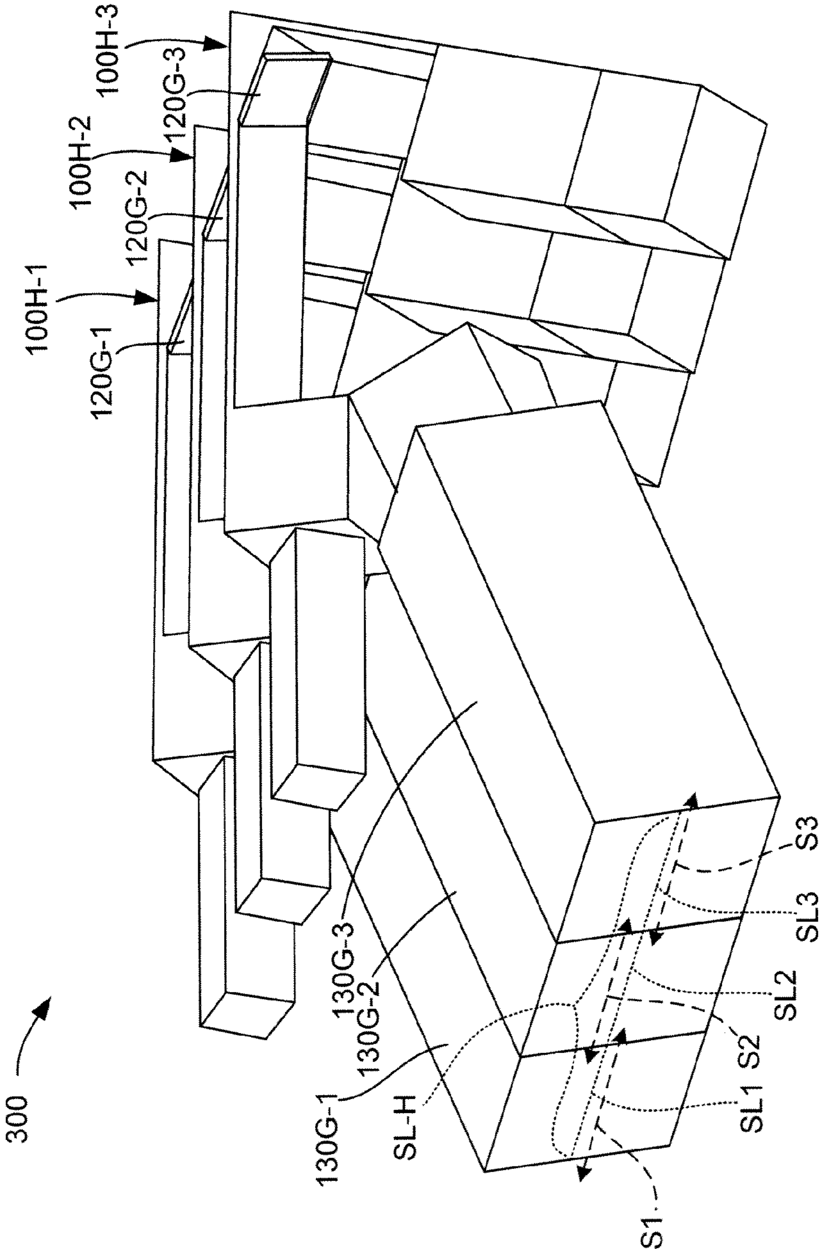
FIG. 11 is a perspective view showing an assembly including multiple imaging systems of FIG. 9 according to another specific embodiment of the present invention.

FIG. 11 is a simplified perspective view showing an assembly 300 made up of a series of three imaging systems 100H-1, 100H-2 and 100H-3 are stacked across the width of an imaging area (i.e., a surface coincident with or parallel to elongated scan line SL-H) according to another embodiment of the present invention. Each imaging systems 100H-1, 100H-2 and 100H-3 is consistent with imaging system 100H described above with reference to FIGS. 9 and 10, as serves as a sub-system of assembly 300. Imaging systems 100H-1, 100H-2 and 100H-3 are arranged such that anamorphic optical system 130G-1 to 130G-3 are fixedly connected in a side-by-side arrangement such that scan line sections SL-1 to SL-3 formed by imaging systems 100H-1, 100H-2 and 100H-3, respectively, are substantially collinear and form an elongated composite scan line image SL-H ("substantially collinear" means that the scan (focal) lines are aligned with sufficient precision to form a single functional scan line). Although assembly 300 is shown with only three subsystems, the illustrated arrangement clearly shows that the folded arrangement described above with reference to FIGS. 9-11 facilitates assembling any number of imaging systems to form a scan line image having any length.

One advantage provided by assembly 300 is that each optical subsystem 100H-1 to 100H-3 can be manufactured using mass-produced, readily available components (e.g., DMD chips produced by Texas Instruments) so that each subsystem can benefit from price reductions coming from volume manufacturing. That is, there is currently no single spatial light modulator device that can be utilized in the imaging system of the present invention that has sufficient size to generate a scan line of 20 inches or more in the cross process direction with sufficient resolution (e.g., 1200 dots-per-inch). By producing multiple optical subsystems (e.g., optical subsystems 100H-1 to 100H-3) using currently commercially available DMD-type spatial light modulator devices, arranging the subsystem components using the folded arrangement described herein, and stacking the subsystems in the manner shown in FIG. 11, an economical assembly can be produced that can produce a scan line of essentially any width.

Another advantage of combining imaging subsystems 100H-1, 100H-2 and 100H-3 in this manner is that this arrangement facilitates automated seamless stitching to align any number of the side by side imaging systems. A key requirement to accomplishing seamless stitching is that each imaging system projects its light over an output length range slightly longer than the total mechanical width of each imaging system such that end portions of the scan line sections produced by each imaging system are overlapped along the elongated composite scan line image. This requirement is accomplished, for example, by modifying the optics associated with anamorphic optical systems 130G-1 to 130G-3 such that each scan line section SL-1 to SL-3 overlaps its adjacent scan line section. For example, as shown in FIG. 11, anamorphic optical system 130G-1 is formed such that scan line section SL-1 is generated with a width S1 that overlaps a portion of scan line section SL-2, scan line sL-2 is generated with a width of S2 that overlaps both scan line sections SL-1 and SL-3, and scan line section SL-3 is generated with a width of S3 that overlaps scan line SL-2. The actual (operating) width of scan line sections SL-1, SL-2 and SL-3 is adjusted using a software operating that permanently turns off those modulating elements (pixels) that are located at the outer edges of spatial light modulators 120G-1 to 120G-3 in a manner that provides a seamless overlap of scan line sections SL-1, SL-2 and SL-3. This approach facilitates compensation for slight mechanical tolerance variations of each individual imaging subsystems 100H-1, 100H-2 and 100H-3, such as bow, skew, and slight mechanical placement deviations of each optical subsystem.

Figure 12:
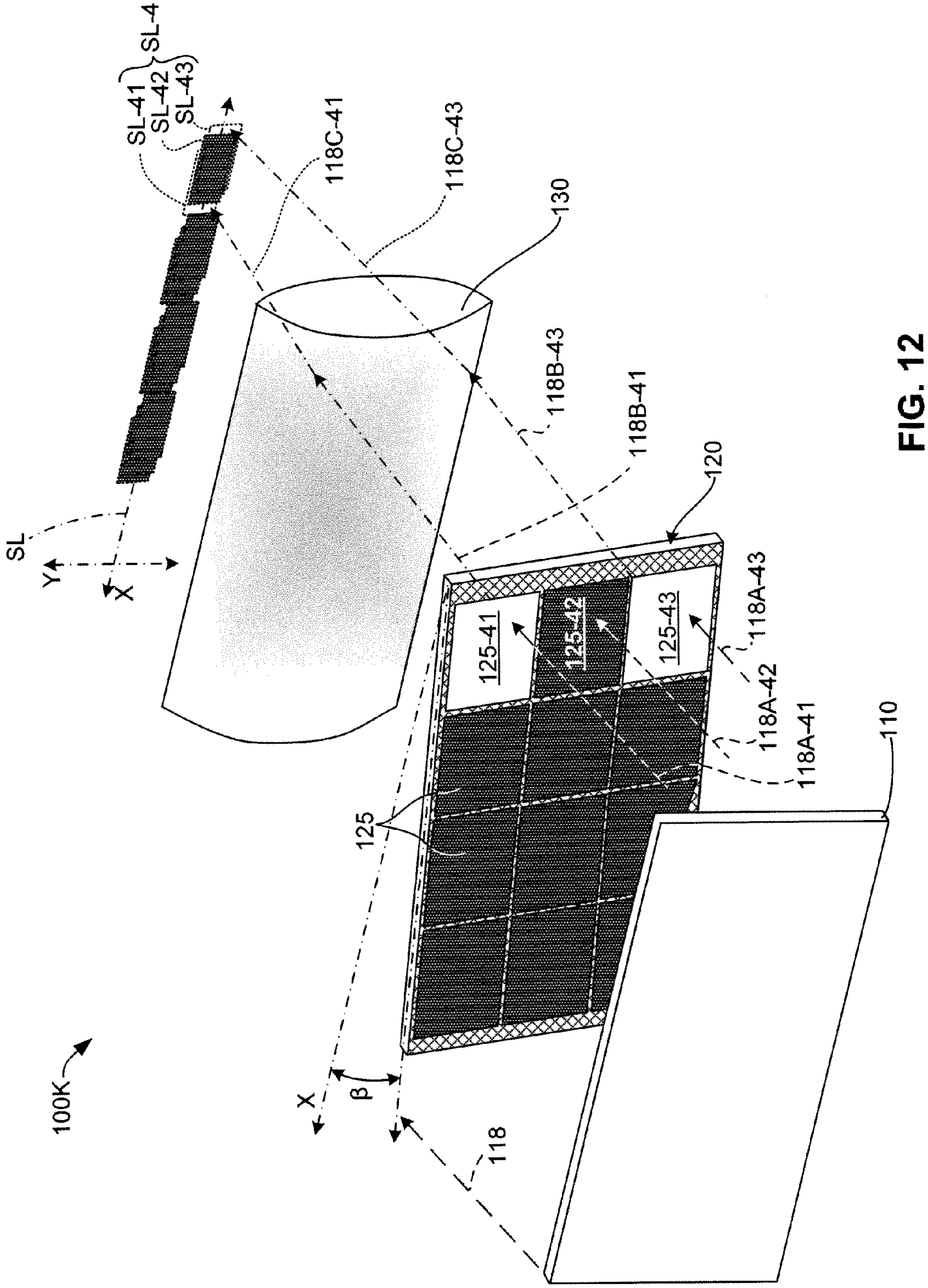
FIG. 12 is a perspective view showing another imaging system including a tilted spatial light modulator according to another specific embodiment of the present invention.

A possible limitation to the imaging systems of the present invention described above is that a particular spatial light modulator may not provide sufficient cross process direction scan line resolution. That is, the imaging systems of the various embodiments described above include arrangements in which the rows and columns of light modulating elements are disposed orthogonal to the focal/scan line (i.e., such that the light portions directed by all light modulating elements in each column in the "on" position are summed on a single imaging region of the focal/scan line). This orthogonal arrangement may present a problem when the desired resolution for a given application is greater than the modulating element resolution (i.e., the center-to-center distance between adjacent elements in a row) of a given spatial light modulator. For example, many photolithography printing applications require dot resolutions of a 1200 dpi with higher placement accuracy with in a line screen half tone image. For example, a 1200 dpi dot may require placement accuracy at 2400 dpi or higher. As an example, one standard DLP chip includes a mirror array having 1024 columns of mirrors spaced 10.8 um apart, equivalent to nearly 2400 dpi and approximately 11 mm long. However, these mirror pixels must be magnified and expanded along the cross process direction (x-axis) by almost a factor of 2× in order that the scan line length is at least 20 mm which allows enough physical space for side by side stitching. This 2× magnification means only 1200 dpi can be achieved, with only 1200 dpi placement accuracy FIG. 12 is a perspective view showing a single-pass imaging system 100K according to another embodiment of the present invention that addresses the potential problems associated with the orthogonal arrangement set forth above. Similar to generalized imaging system 100 (discussed above with FIG. 1), imaging system 100K generally includes homogenous light generator 110, spatial light modulator 120, and an anamorphic optical (e.g., projection lens) system 130 that operate substantially as discussed above. However, imaging system 100K differs from the generalized imaging system in that spatial light modulator 120 is tilted relative to anamorphic optical system 130 such that the rows of modulating elements 125 are aligned at an acute tilt angle β relative to scan line SL, whereby anamorphic optical system 130 focuses each modulated light portion onto an associated sub-imaging region of elongated focal line (e.g., anamorphic optical system 130 concentrates light portions 118C-41 to 118C-43 onto sub-imaging regions SL-41 to SL-43, respectively, of imaging region SL-4). This tilt angle allows for higher addressability in dot placement for forming line-screen half tone images.

Figure 13:
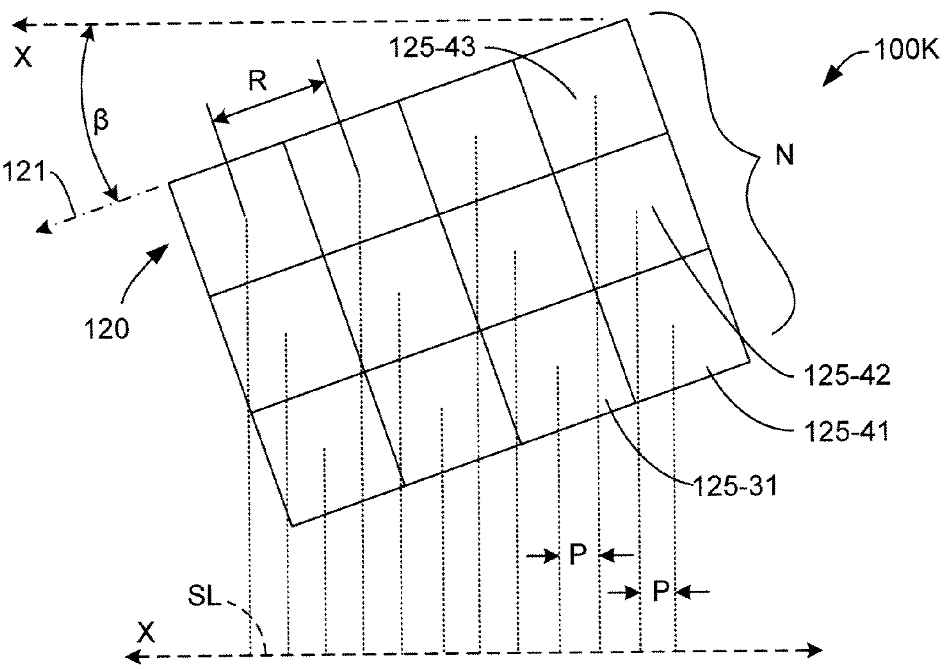
FIG. 13 is a simplified diagram depicting the tilted spatial light modulator of FIG. 12 during operation.

As indicated in FIG. 13, which is a simplified diagram depicting the tilted orientation of a top horizontal edge 121 of spatial light modulator 120 and scan line SL (which extends in the X-axis direction), according to an aspect of the present embodiment, tilt angle β is selected such that the centers of each modulating elements 125-11 to 125-43 are equally spaced along the X-axis direction, whereby each light portion passed through each modulating elements 125-11 to 125-43 is directed onto a corresponding unique region of scan line SL. That is, tilt angle β is selected such that the centers of each modulating element 125-11 to 125-43 (indicated by vertical dashed lines) are separated by a common pitch P along scan line SL (e.g., the centers of modulating element 125-41 and 125-42 and the centers of modulating element 125-43 and 125-31 are separated by the same pitch distance P). In one embodiment, in order to equalize the pitch distance P for all modulating elements of spatial light modulator 120, tilt angle β is set equal to the arctangent of 1/n, where n is the number of modulating elements in each column (that is, for the simplified example, n=3), giving a uniform pitch distance P that is equal to the R/n, where R is the modulating element resolution determined by the center-to-center distance between adjacent modulating elements in each row.

Referring again to FIG. 12, due to the tilted orientation of spatial light modulator 120 relative to scan line SL, the centers of modulating elements 125-41 to 125-43 are sequentially shifted to the right along the X-axis direction (i.e., the center of modulating element 125-41 is slightly to the left of the center of modulating element 125-42, which in turn is slightly to the left of the center of modulating element 125-43). Referring to the upper right portion of FIG. 12, the slight offset between the light modulating elements in each column causes anamorphic optical system 130 to concentrate the light portions received from each light modulating element such that light is centered on an associated unique sub-imaging region of elongated scan line SL. For example, modulated light portions 118B-41 and 118B-43, which are passed by modulating elements 125-41 and 125-43 to anamorphic optical system 130, are anamorphically concentrated by anamorphic optical system 130 such that concentrated light portions 118C-41 and 118C-43 are centered on sub-imaging regions SL-41 and SL-43 (the dark region on sub-imaging regions SL-42 is produced because modulating element 125-42 is in the "off" state). Note that overlap of light passed by modulating elements 125-41 and 125-43 is ignored for explanatory purposes, and the slight offset in the Y-axis direction is amplified for illustrative purposes. The benefit of this tilted orientation is that imaging system 100K produces a finer pitch sub-pixel addressable spacing resolution than that possible using a right-angle orientation, and provides an opportunity to utilize software to position image "pixels" with fractional precision in both the X-axis and Y-axis directions.

Figure 14:
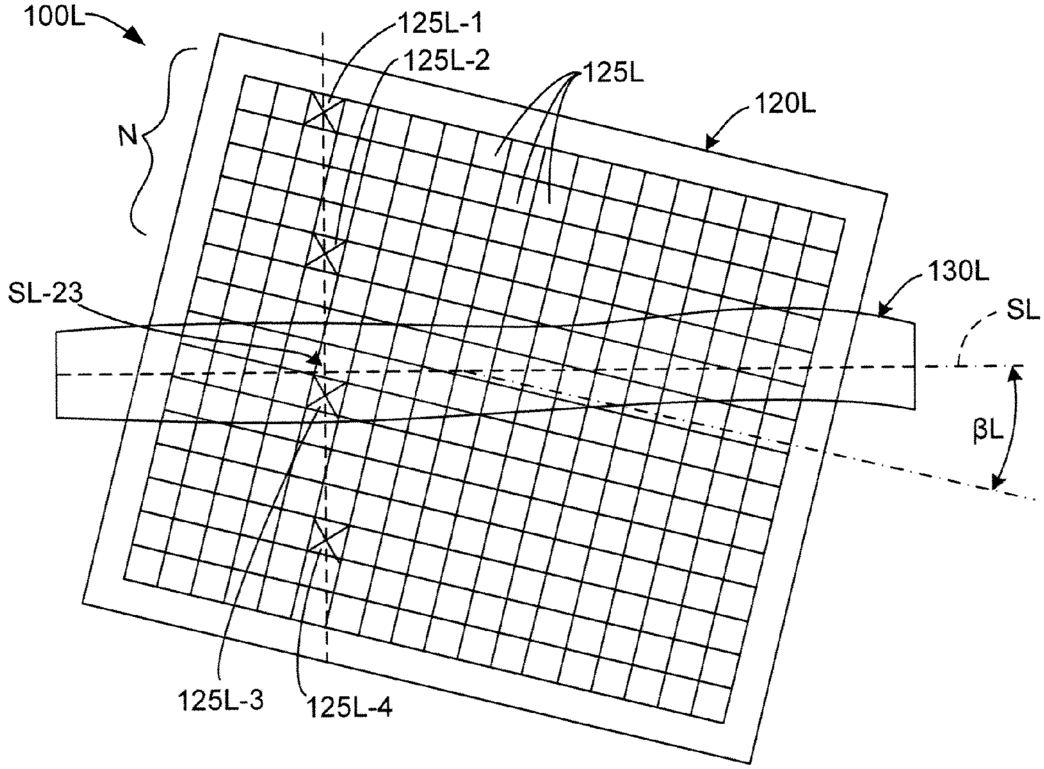
FIG. 14 is a perspective view showing another imaging system including a tilted DMD-type spatial light modulator according to another specific embodiment of the present invention.

FIG. 14 is a partial front view showing a portion of an imaging system 100L including a simplified DMD-type spatial light modulator 120L that is inclined at a tilt angle βL relative to a scan line SL generated by an associated anamorphic optical system 130L according to another specific embodiment of the present invention. Because exemplary DMD-type spatial light modulator 120L includes fifteen mirrors 125L in each column, the optimal tilt angle in this example is 3.81° (i.e., the arctangent of 1/15). In one preferred embodiment, 24 pixel columns are used and the tilt angle is therefore arctangent of 1/24 or 2.38 degrees. In the illustrated embodiment, these numbers are exaggerated for easy of visualization, and the illustrated tilt angle βL is approximately 14.0° (i.e., the arctangent of ¼) in order to produce a sub-pixel spacing of four pixels per column of mirrors. Note also that adjacent image pixels are slightly overlapped and provide extra addressability in the fast scan direction so that vertical edges can be adjusted left or right in sub-pixel increments. For the process direction, timing can be adjusted to ensure that horizontal edges are delayed or advanced in time to occur at a position where they are needed, also in sub-pixel increments.

Variable resolution can be implemented by controlling the number of mirror centers located within each imaging region. Referring to FIG. 13 as an example where n=3, using three mirrors in a vertical row increases the image resolution by a factor of three. In contrast, if a tilt angle were selected such that every four mirrors as in FIG. 14, a slightly smaller tilt angle βL is used than that of the embodiment shown in FIG. 13, producing a higher resolution. When n is 760 or greater (as in typical DLP chips), it is easy to see that a wide range of alternate resolutions could be implemented with high precision.

Similar to the orthogonal arrangement described above, the tilted orientation shown in FIG. 14 also facilitates variable power along the scan line SL. That is, to produce an image having a maximum power or brightness at image sub-imaging region SL-23, all of mirror elements 125L-1 to 125L-4 may be toggled to the "on" position, and to produce an image having a lower power at image sub-imaging region SL-23, one or more of mirror elements 125L-1 to 125L-4 may be toggled to the "off" position. Moreover, not all the DMD mirrors need be utilized for full power performance. One or more "reserve" mirrors can be saved (i.e., deactivated) during normal operation, and utilized to replace a malfunctioning mirror or to increase power above the normal "full" power during special processing operations. Conversely, fewer mirrors can be used to decrease power in a particular image sub-region to correct intensity defects. By calibrating the number of mirrors available for ablation as a function of scan position, the power can be kept uniform over the scan surface, and calibrated at will when off line.

According to an embodiment of the present invention, apparatus 400M is a printer or scanner used for variable data lithographic printing in which imaging drum cylinder 160M is coated with a fountain (dampening) solution that is ablated by laser light processed by imaging system 100M in the manner described above and depicted in FIG. 15. That is, instead of standard offset using a plate with static imaging and non-imaging areas which are selectively wetted with ink and water, and subsequent transfer of the ink to paper, the ink is generally applied to a roller over a liquid dampening solution that has been selectively ablated by imaging system 100M. In this apparatus, only the ablated areas of the roller will transfer ink to the paper. Thus, variable data from ablation is transferred, instead of constant data from the plate as in conventional systems. For this process to work using a rastered light source (i.e., a light source that is rastered back and forth across the scan line), a single very high power light (e.g., laser) source would be required to sufficiently ablate the dampening solution in real time. The benefit the present invention is that, because the dampening liquid solution is ablated from the entire scan line simultaneously, a variable data high speed lithographic printing press is provided using multiple relatively low power light sources.

Figure 15:
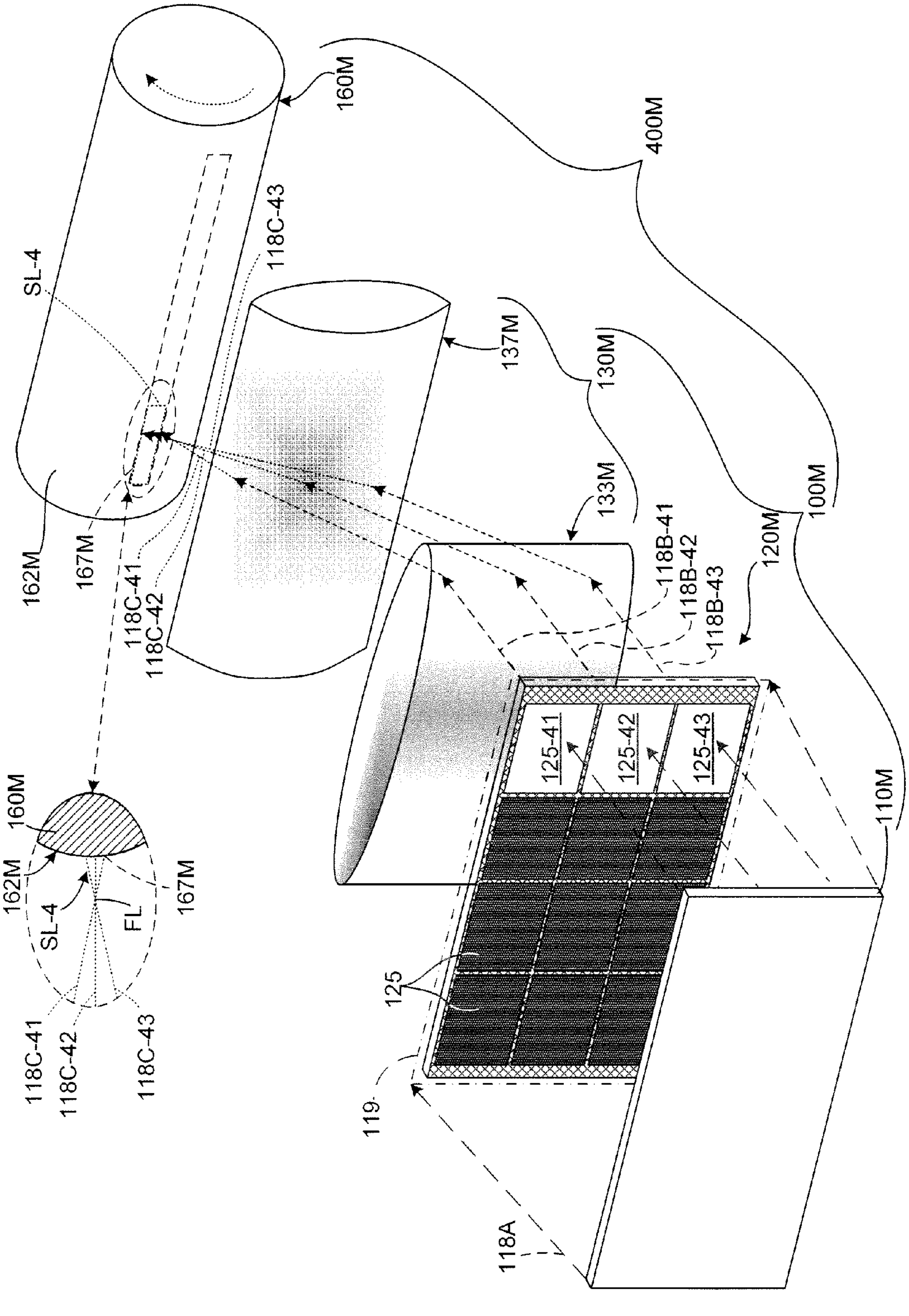
FIG. 15 is a perspective view showing an imaging apparatus according to another specific embodiment of the present invention.

FIG. 15 is a simplified perspective view showing a scanning/printing apparatus 400M that includes single-pass imaging system 100M and a scan structure (e.g., an imaging drum cylinder) 160M according to another embodiment of the present invention. As described above, imaging system 100M generally includes a homogenous light generator 110M for generating a homogenous light field 119, a spatial light modulator 120M, and an anamorphic optical (e.g., projection lens) system 130M that function essentially as set forth above.

Referring to upper right portion of FIG. 15, imaging drum cylinder (roller) 160M is positioned relative to image system 100M such that anamorphic optical system 130M images and concentrates the modulated light portions received from spatial light modulator 120M onto an imaging surface 162M of imaging drum cylinder 160M, and in particular into an imaging region 167M of imaging surface 162M, using a cross-process optical subsystem 133M and a process-direction optical subsystem 137M in accordance with the technique described above with reference to FIGS. 4(A) and 4(B). In a presently preferred embodiment, cross-process optical subsystem 133M acts to horizontally invert the light passed through spatial light modulator 120M (i.e., such that modulated light portions 118B-41, 118B-42 and 118B-43 are directed from the right side of cross-process optical subsystem 133M toward the left side of imaging region 167M). In addition, in alternative embodiments, imaging drum cylinder 160M is either positioned such that imaging surface 162M coincides with the scan (or focal) line defined by anamorphic optical system 130M, whereby the concentrated light portions (e.g., concentrated light portions 118C-41, 118C-42 and 118C-43) concentrate to form a single one-dimensional spot (light pixel) SL-4 in an associated portion of imaging region 167M, or such that imaging surface 162M is coincident with the focal line defined by anamorphic optical system 130M, whereby the light portions form a swath containing a few imaging lines (i.e., such that the light sub-pixel formed by light portion 118C-41 is separated from the light sub-pixel formed by light portion 118C-43. In a presently preferred embodiment, as indicated by the dashed-line bubble in the upper right portion of FIG. 15, which shows a side view of imaging drum cylinder 160M, imaging surface 162M is set at the focal line FL location such that the image generated at scan line SL-4 by beams 118C-41, 118C-42 and 118C-43 is inverted in the fashion indicated in the dashed-line bubble. Additional details regarding anamorphic optical system 130M are described in co-owned and co-pending application Ser. No. 13/216,97, entitled ANAMORPHIC PROJECTION OPTICAL SYSTEM for high speed lithographic data imaging, which is incorporated herein by reference in its entirety.

According to an embodiment of the present invention, apparatus 400M is a printer or scanner used for variable data lithographic printing in which imaging drum cylinder 160M is coated with a fountain (dampening) solution that is ablated by laser light processed by imaging system 100M in the manner described above and depicted in FIG. 15. That is, instead of standard offset using a plate with static imaging and non-imaging areas which selectively wet ink and water, and subsequent transfer of the ink to paper, the ink is generally applied to a roller over a liquid dampening solution that has been selectively ablated by imaging system 100M. In this apparatus, only the ablated areas of the roller will transfer ink to the paper. Thus, variable data from ablation is transferred, instead of constant data from the plate as in conventional systems. For this process to work using a rastered light source (i.e., a light source that is rastered back and forth across the scan line), a single very high power light (e.g., laser) source would be required to sufficiently ablate the dampening solution in real time. The benefit of the present invention is that, because the dampening liquid is ablated from the entire scan line simultaneously, a variable data high speed lithographic printing press is provided using multiple relatively low power light sources.

Figure 16A:
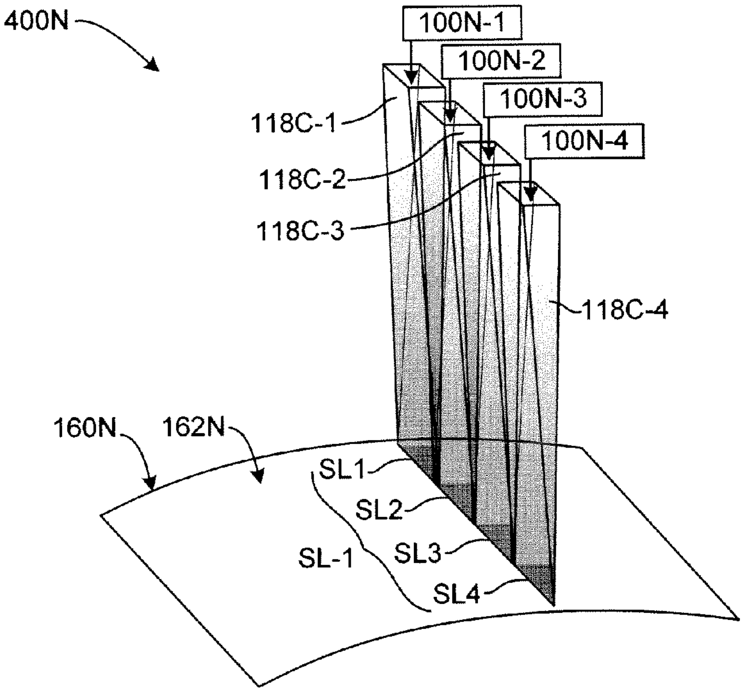
FIGS. 16(A) and 16(B) are simplified perspective diagrams showing alternative imaging apparatus according to alternative specific embodiments of the present invention.
Figure 16B:
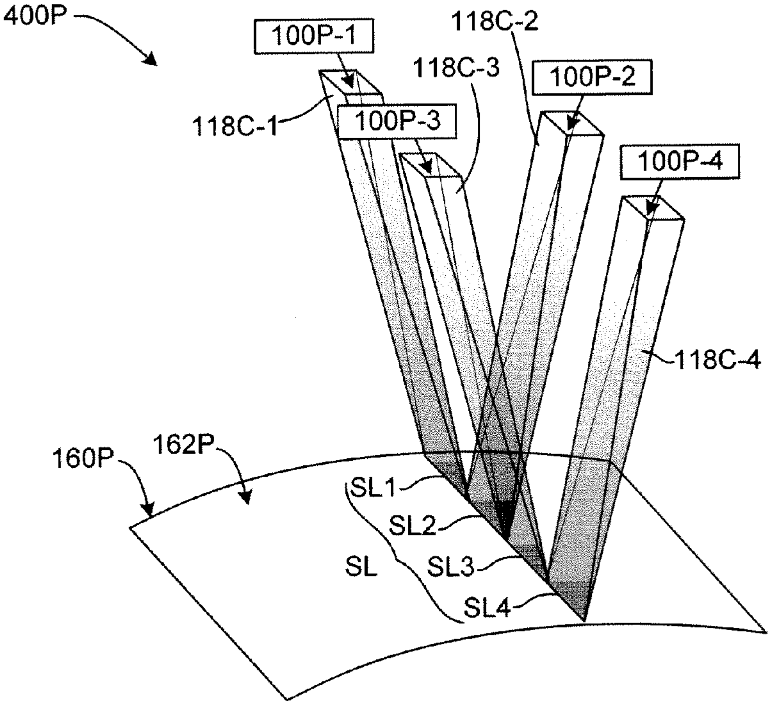

FIGS. 16(A) and 16(B) are simplified perspective views showing portions of imaging apparatus 400N and 400P according to alternative embodiments of the present invention. Each of these figures shows the wedge-shaped light beam fields 118C-1 to 118C-4 generated by associated imaging systems (which are shown as blocks to simplify the diagram), and a portion of an imaging drum cylinder on which the beam fields form associated scan line segments SL1-SL4, which collectively form a scan line SL in the manner described above. Imaging apparatus 400N and 400P are similar in that imaging systems 100N-1 to 100N-4 generate and direct wedge-shaped light beam fields 118C-1 to 118C-4 onto surface 162N of imaging drum cylinder 160N to form scan line SL (see FIG. 16(A)), and imaging systems 100P-1, 100P-2, 100P-3 and 100P-4 generate and direct wedge-shaped light beam fields 118C-1, 118C-2, 118C-3 and to 118C-4 onto surface 162P of imaging drum cylinder 160P to form scan line SL (see FIG. 16(B)). Imaging apparatus 400N and 400P differ in that imaging systems 100N-1 to 100N-4 are arranged in an aligned pattern (e.g., using the techniques described above with reference to FIGS. 10 and 11), whereas imaging systems 100P-1 to 100P-4 are arranged in an offset pattern. That is, both scan lines SL are stitched together from four scan line segments SL1-SL4, but because imaging systems 100N-1 to 100N-4 are closely-spaced and arranged in a single row, the sources generating beam fields 118C-1 to 118C-4 in imaging apparatus 400N are collinear and beam fields 118C-1 to 118C-4 are directed normal to imaging surface 162N. In contrast, in order to facilitate more room for the body of each individual imaging system 100P-1 to 100P-4, imaging system 100P-1 to 100P-4 are arranged to generate beam fields 118C-1 to 118C-4 directed at small interlaced angles. That is, imaging systems 100P-1 to 100P-4 are arranged in two parallel rows, with imaging systems 100P-1 and 100P-3 aligned in the first row and imaging systems 100P-1 and 100P-3 aligned in the second row. Because all of imaging systems 100P-1 to 100P-4 are oriented to generate scan line SL, wedge-shaped light beam fields 118C-1 to 118C-4 are directed onto surface 162P from two different directions in an interlaced feathered manner and at a shallow angle relative to the normal direction of surface 162P at scan line SL. This offset pattern arrangement provides more room between adjacent imaging systems 100P-1 to 100P-4 than that provided by the aligned arrangement of imaging apparatus 400N (FIG. 16(A)).

Although the present invention has been described with respect to certain specific embodiments, it will be clear to those skilled in the art that the inventive features of the present invention are applicable to other embodiments as well, all of which are intended to fall within the scope of the present invention. For example, according to an alternative embodiments of the present invention, the anamorphic optical systems of the final assembly (e.g., anamorphic optical systems 130G-1 to 130G-3, see FIG. 11) may share a final monolithic focusing lens. In addition, although the present invention is illustrated as having light paths that are linear (see FIG. 1) or with having one fold (see FIG. 8), other arrangements may be contemplated by those skilled in the art that include folding along any number of arbitrary light paths. Finally, the methods described above for generating a high energy scan line image may be achieved using devices other than those described herein.

The invention claimed is:

1. A single-pass imaging system comprising:

a homogenous light generator for generating homogenous light such that the homogenous light forms a substantially uniform homogenous light field;

a spatial light modulator including:

a plurality of light modulating elements arranged in a two-dimensional array and disposed in the homogenous light field such that each said modulating element receives an associated homogenous light portion of the homogenous light, and a controller for individually controlling the plurality of modulating elements such that each modulating element is adjustable, in response to an associated control signal generated by the controller, between a first modulated state and a second modulated state, whereby when said each modulating element is in said first modulated state, said each modulating element modulates an associated received homogenous light portion such that an associated modulated light portion is directed in a corresponding predetermined direction, and when said each modulating element is in said second modulated state, said each modulating element modulates the associated received homogenous light portion such that the associated modulated light portion is prevented from passing along said corresponding predetermined direction; and an anamorphic optical system positioned to receive said modulated light portions from said each modulating element disposed in said first modulated state, and arranged to concentrate said modulated light portions such that the concentrated modulated light portions produce an elongated scan line image, wherein the plurality of light modulating elements are arranged in a plurality of rows and a plurality of columns, wherein each said column includes an associated group of said plurality of light modulating elements, and wherein the anamorphic optical system is arranged to concentrate modulated light portions received from each associated group of said plurality of light modulating elements of each said column onto an associated scan line portion of said elongated scan line image.

2. The imaging system according to claim 1, wherein the homogenous light generator comprises at least one light source for generating one or more light beams, and at least one light homogenizer including means for homogenizing said one or more light beams such that portions of said homogenized light beams are directed onto two or more of said plurality of light modulating elements.

3. The imaging system according to claim 2, wherein said at least one light source comprises one of a laser and a light emitting diode.

4. The imaging system according to claim 2, wherein said at least one light source comprises a plurality of light sources arranged along a line that is parallel to said plurality of rows of said light modulating elements.

5. The imaging system according to claim 2, wherein said at least one laser comprises a plurality of vertical cavity surface emitting lasers (VCSELs) arranged in a two-dimensional array.

6. The imaging system according to claim 2, wherein the light homogenizer includes at least one of a tapered light pipe and a microlens array.

7. A single-pass imaging system comprising:

a homogenous light generator for generating homogenous light such that the homogenous light forms a substantially uniform homogenous light field;

a spatial light modulator including:

a plurality of light modulating elements arranged in a two-dimensional array and disposed in the homogenous light field such that each said modulating element receives an associated homogenous light portion of the homogenous light, and a controller for individually controlling the plurality of modulating elements such that each modulating element is adjustable, in response to an associated control signal generated by the controller, between a first modulated state and a second modulated state, whereby when said each modulating element is in said first modulated state, said each modulating element modulates an associated received homogenous light portion such that an associated modulated light portion is directed in a corresponding predetermined direction, and when said each modulating element is in said second modulated state, said each modulating element modulates the associated received homogenous light portion such that the associated modulated light portion is prevented from passing along said corresponding predetermined direction; and an anamorphic optical system positioned to receive said modulated light portions from said each modulating element disposed in said first modulated state, and arranged to concentrate said modulated light portions such that the concentrated modulated light portions produce an elongated scan line image, wherein the anamorphic optical system includes a cross-process optical subsystem and a process-direction optical subsystem.

8. The imaging system according to claim 7, wherein the cross-process optical subsystem includes first and second focusing lens arranged to project and magnify said modulated light portions in a cross-process direction, and wherein the process-direction optical subsystem includes a third focusing lens arranged to concentrate said modulated light portions on said elongated scan line image parallel to a process direction.

9. The imaging system according to claim 8, wherein the anamorphic optical system further comprises a collimating lens disposed between the spatial light modulator and the plurality of focusing lens.

10. The imaging system according to claim 7, wherein the spatial light modulator comprises one of a digital micromirror device, an electro-optic diffractive modulator array, and an array of thermo-optic absorber elements.

11. The imaging system according to claim 7, wherein each of the plurality of light modulating elements comprises a microelectromechanical (MEMs) mirror mechanism disposed on a substrate, and wherein each MEMs mirror mechanism includes a mirror and means for supporting and moving the mirror between a first tilted position relative to the substrate, and a second tilted position relative to the substrate, according to said associated control signals generated by the controller.

12. The imaging system according to claim 11, wherein the homogenous light generator, the spatial light modulator and the anamorphic optical system are positioned such that, when the mirror of each said MEMs mirror mechanism is in the first tilted position, said mirror reflects an associated received homogenous light portion such that said modulated light portion is directed to the anamorphic optical system, and when said mirror of each said MEMs mirror mechanism is in the second tilted position, said mirror reflects said associated received homogenous light portion such that said reflected received homogenous light portion is directed away from the anamorphic optical system.

13. The imaging system according to claim 12, further comprising a heat sink fixedly positioned relative to the spatial light modulator such that when said mirror of each said MEMs mirror mechanism is in the second tilted position, said reflected received homogenous light portion is directed onto said heat sink.

14. The imaging system according to claim 13, further comprising a frame having a base portion defining a support area, a first arm and a second arm extending from the base portion on opposite sides of the support area, first and second brackets integrally attached to the first arm, and a third bracket integrally attached to the second arm, wherein the spatial light modulator is fixedly attached to the support area, wherein the homogenous light generator and the anamorphic optical system are respectively fixedly attached to the first and second brackets, and wherein the heat sink is fixedly attached to the third bracket.

15. The imaging system according to claim 7, wherein the light modulating elements are arranged in a plurality of rows and a plurality of columns, wherein each said column includes an associated group of said plurality of light modulating elements, and wherein the spatial light modulator is tilted relative to the elongated scan line image such that the said concentrated modulated light portions are directed onto an associated sub-imaging region of said elongated scan line image.

16. The imaging system according claim 15, wherein each of the plurality of light modulating elements comprises a microelectromechanical (MEMs) mirror mechanism disposed on a substrate, and wherein each MEMs mirror mechanism including a mirror and means for supporting and moving the mirror between a first tilted position relative to the substrate, and a second tilted position relative to the substrate, according to said associated control signals generated by the controller.

* * * * *